US009600893B2

(12) United States Patent
Minato et al.

(10) Patent No.: US 9,600,893 B2
(45) Date of Patent: Mar. 21, 2017

(54) IMAGE PROCESSING DEVICE, METHOD, AND MEDIUM FOR DISCRIMINATING A TYPE OF INPUT IMAGE USING NON-COMMON REGIONS

(71) Applicant: OMRON CORPORATION, Kyoto (JP)

(72) Inventors: Yoshihisa Minato, Kyoto (JP); Yuhki Akatsuka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 23 days.

(21) Appl. No.: 14/601,524

(22) Filed: Jan. 21, 2015

(65) Prior Publication Data

US 2015/0262370 A1    Sep. 17, 2015

(30) Foreign Application Priority Data

Mar. 14, 2014    (JP) .................................. 2014-051321

(51) Int. Cl.
*G06T 7/00* (2006.01)
*G06K 9/46* (2006.01)
(Continued)

(52) U.S. Cl.
CPC .......... *G06T 7/0081* (2013.01); *G06K 9/3241* (2013.01); *G06K 9/4609* (2013.01);
(Continued)

(58) Field of Classification Search
CPC .................................................. G06T 7/0081
See application file for complete search history.

(56) References Cited

U.S. PATENT DOCUMENTS

| 8,374,437 | B2 | 2/2013 | Nakamura et al. |
| 2008/0068622 | A1* | 3/2008 | Deng ................ G06F 17/30256 358/1.3 |
| 2009/0141984 | A1 | 6/2009 | Nakamura et al. |
| 2013/0051667 | A1* | 2/2013 | Deng ................ G06K 9/00691 382/168 |

FOREIGN PATENT DOCUMENTS

JP    2009-116385    5/2009

OTHER PUBLICATIONS

U.S. Appl. No. 14/625,968 to Erina Kawabata et al., filed Feb. 19, 2015.
(Continued)

*Primary Examiner* — David F Dunphy
(74) *Attorney, Agent, or Firm* — Greenblum & Bernstein, P.L.C.

(57) ABSTRACT

The invention provides an image processing device, an image processing method, and an image processing program capable of correctly discriminating a type of a test object, even when similar model images have been registered. The image processing device includes: a hardware that holds a feature amount obtained from model images of a plurality of reference objects belonging to mutually different types; a region determination module that determines a non-common region as a region indicating a feature amount different from those of other objects, within a model image of each object; and a discrimination module that discriminates which type an object included in an input image belongs to, by using a feature amount corresponding to a non-common region of the object out of feature amounts of objects.

16 Claims, 17 Drawing Sheets

(51) Int. Cl.
*G06K 9/62* (2006.01)
*G06K 9/32* (2006.01)
*G06K 9/68* (2006.01)

(52) U.S. Cl.
CPC ......... *G06K 9/6201* (2013.01); *G06K 9/6202* (2013.01); *G06K 9/685* (2013.01); *G06K 2009/6213* (2013.01); *G06K 2209/19* (2013.01)

(56) References Cited

OTHER PUBLICATIONS

U.S. Appl. No. 14/625,894 to Yoshihisa Minato et al., filed Feb. 19, 2015.
U.S. Appl. No. 14/561,728 to Yoshihisa Minato et al., filed Dec. 5, 2014.
U.S. Appl. No. 14/602,565 to Yoshihisa Minato et al., filed Jan. 22, 2015.
Extended European Search Report issued by the European Patent Office (EPO) in European Patent Application No. 15151901.4, dated Dec. 3, 2015.
Sara Su, "Principal Component Analysis for Image Classification", XP55230303, Retrieved from the Internet: URL:http://www.cs.tufts.edu/~sarasu/courses/comp175-2009fa/project/project-billingham/NLA_CG_termPaper2009.pdf. (Jan. 1, 2009).
Piyanuch Silapachote et al., "Feature Selection Using Adaboost for Face Expression Recognition", XP55230410, Retrieved from the Internet: URL:http://www-robotics.cs.umass.edu/Papers/viip2004-deepak.pdf. (Jan. 1, 2005).

* cited by examiner

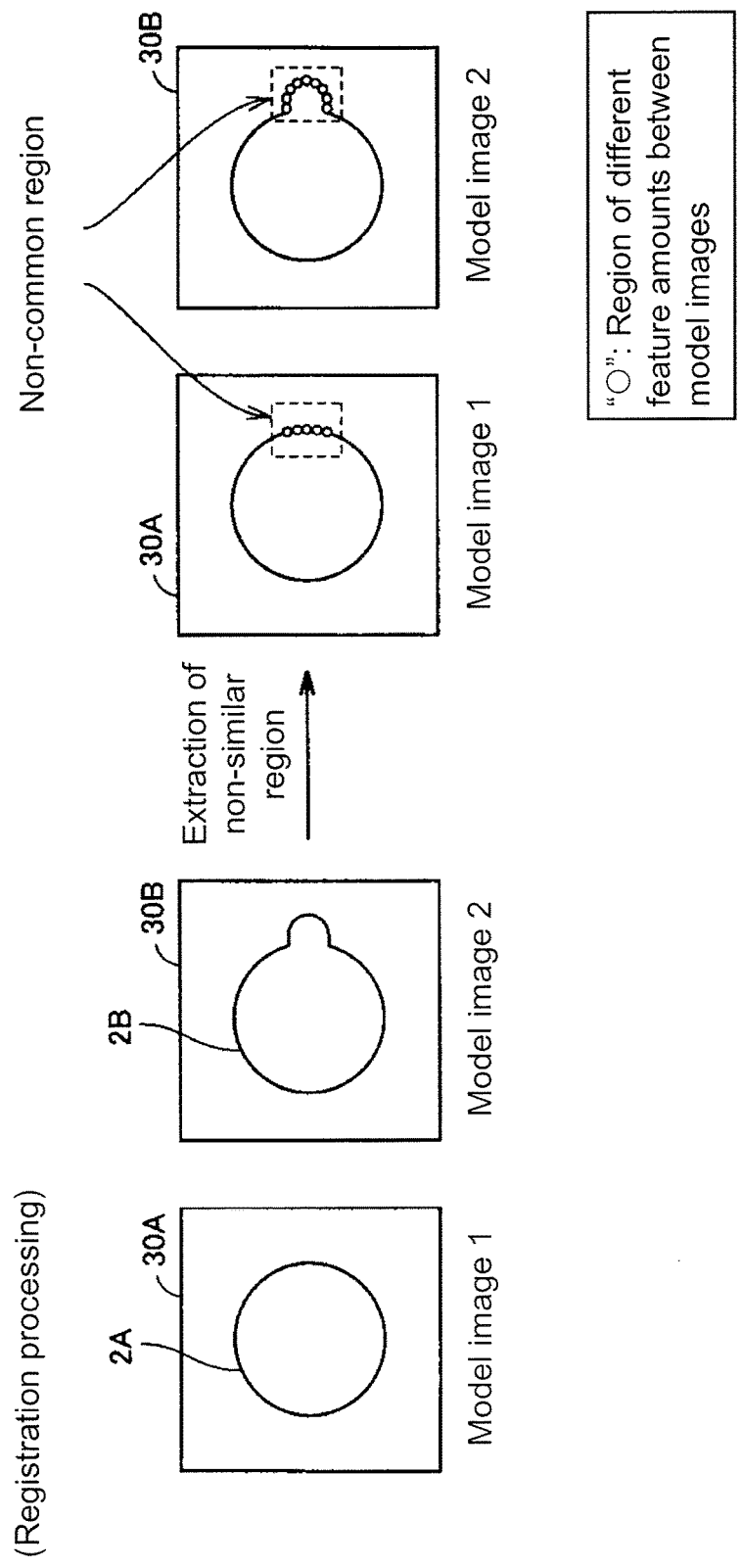

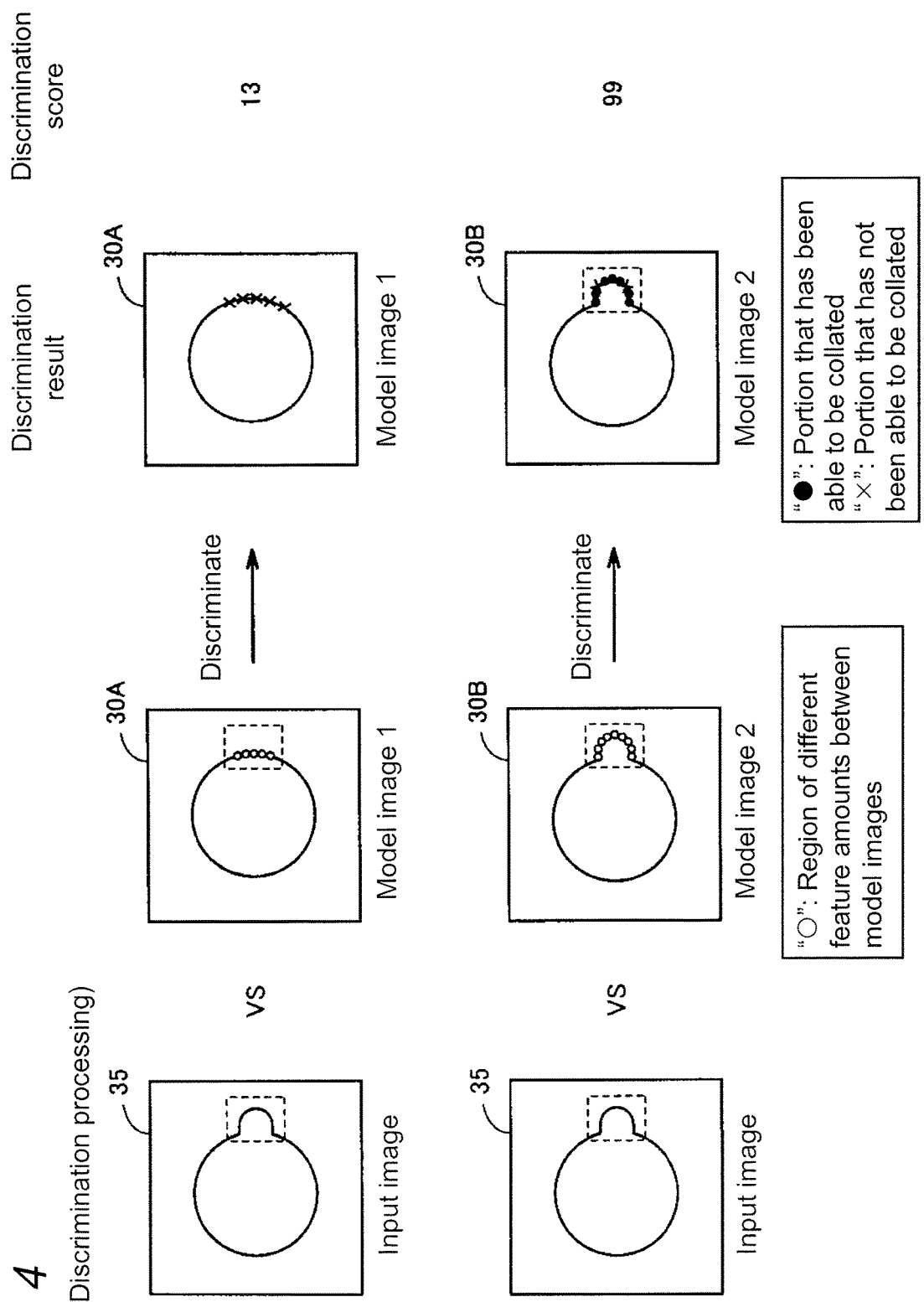

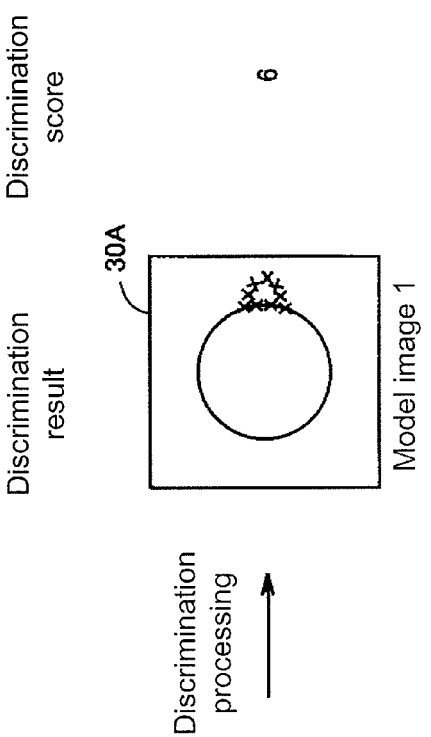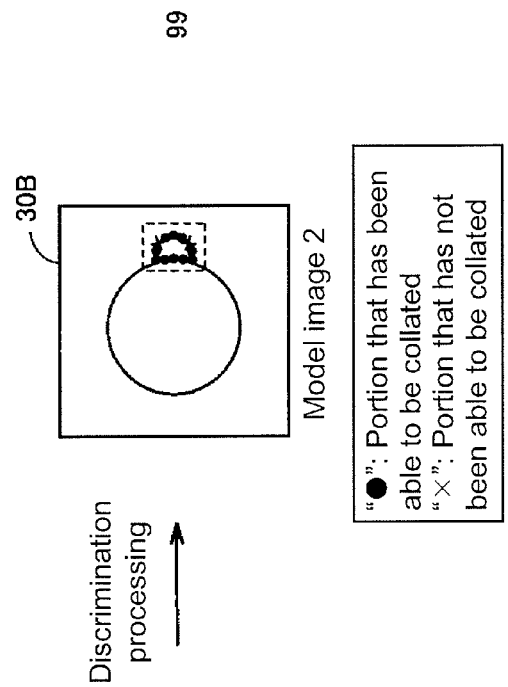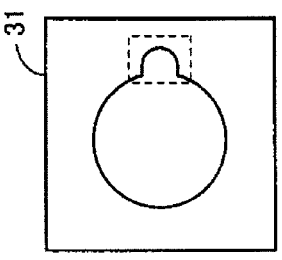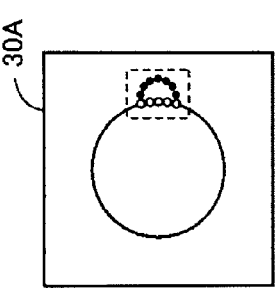
FIG. 15

"○": Portion that exists in only one image and does not exist in other two images
"●": Portion that exists in two images and does not exist in the other one image

IMAGE PROCESSING DEVICE, METHOD, AND MEDIUM FOR DISCRIMINATING A TYPE OF INPUT IMAGE USING NON-COMMON REGIONS

CROSS-REFERENCE TO RELATED APPLICATION

This application is based on Japanese Patent Application No. 2014-051321 filed with the Japan Patent Office on Mar. 14, 2014, the entire contents of which are incorporated herein by reference.

FIELD

The present invention relates to an image processing device, an image processing method, and an image processing program capable of discriminating a type of a test object.

BACKGROUND

In recent years, in the FA (Factory Automation) field, there have been developed image processing techniques for discriminating a type of a test object such as a work, by image-capturing the test object. For example, Unexamined Japanese Patent Publication No. 2009-116385 discloses an image identification device that can correctly perform identification even when similar model images have been registered. The image identification device performs discrimination by using information of a feature point having a low correlation value among similar model images.

SUMMARY

When performing discrimination (hereinafter, also referred to as "product type discrimination") about to which one of a plurality of product types having similar shapes a test object belongs, it is important to know which portion of the test object has been used to perform the discrimination processing. This is because when a user can visually confirm a portion of the test object used in the discrimination processing, it is possible to find a cause of a bad discrimination result.

A technique disclosed in Unexamined Japanese Patent Publication No. 2009-116385 is for performing a discrimination processing by using all information of similar model images. Therefore, in the technique, there is a possibility of performing the discrimination processing with unsuitable information for the discrimination. This may lead to lowering accuracy of the discrimination processing. Consequently, there has been desired an image processing device capable of performing a discrimination processing by using information of a portion which is suitable for the discrimination processing of a type of a test object.

According to an embodiment, an image processing device includes: a storage unit that holds a feature amount obtained from model images of a plurality of reference objects belonging to mutually different types; a region determination unit that determines a non-common region as a region indicating a feature amount different from those of other objects, within a model image of each object; and a discrimination unit that discriminates which type an object included in an input image belongs to, by using a feature amount corresponding to a non-common region of the object out of feature amounts of objects.

Preferably, the discrimination unit performs a matching processing to the input image by using a feature amount corresponding to a non-common region of each reference object, and specifies a reference object of which a score obtained as a result of the matching processing is higher than those of other reference objects.

Preferably, the image processing device further includes a setting unit that sets a region to be used in a discrimination processing of the discrimination unit and a region not to be used in the discrimination processing, to a non-common region of at least one model image out of a plurality of the model images.

Preferably, the discrimination unit sets such that a matching processing result of a unique non-common region among a plurality of the model images gives a large influence to the discrimination result of types.

Preferably, the discrimination unit performs a matching processing of each portion of a non-common region of the model image with the input image, and calculates the score by using a result of the matching processing of each portion of the non-common region.

Preferably, the image processing device further includes a display unit for displaying in an identifiable mode a result of the matching processing to a non-common region of any one model image out of the model images.

Preferably, the display unit displays, in superposition with any one model image of a plurality of the model images, a result of the matching processing to a non-common region of the model image.

Preferably, the display unit displays by different modes, a result of a matching processing that a degree of similarity to the input image is relatively high, and a result of a matching processing that a degree of similarity to the input image is relatively low.

Preferably, the display unit displays in an identifiable mode, a non-common region of any one model image of a plurality of the model images, in superposition with the model image.

Preferably, the non-common region includes an object region in which an object is included in the non-common region. Preferably, the display unit displays in an identifiable mode, an object region included in a non-common region of any one model image out of a plurality of the model images, in superposition with the model image.

Preferably, the non-common region further includes a non-object region in which an object is not included in the non-common region. The display unit displays by different modes an object region included in a non-common region of any one model image out of a plurality of the model images and a non-object region included in the non-common region of the model image, in superposition with the model image.

According to other embodiment, an image processing method includes: a step of holding a feature amount obtained from model images of a plurality of reference objects belonging to mutually different types; a step of determining a non-common region as a region indicating a feature amount different from those of other objects, within a model image of each object; and a step of discriminating which type an object included in an input image belongs to, by using a feature amount corresponding to a non-common region of the object out of feature amounts of objects.

According to still other embodiment, there is provided an image processing program. The image processing program makes a computer execute: a step of holding a feature amount obtained from model images of a plurality of reference objects belonging to mutually different types; a step of determining a non-common region as a region indicating a feature amount different from those of other objects, within a model image of each object; and a step of discriminating which type an object included in an input image belongs to, by using a feature amount corresponding to a non-common region of the object out of feature amounts of objects.

According to the present invention, even when similar model images have been registered, it is possible to correctly discriminate a type of a test object.

BRIEF DESCRIPTION OF THE DRAWINGS

FIG. 3 is a conceptual diagram of a state that an image processing device is extracting regions in which shapes of works are different between two model images according to the first embodiment;

FIG. 4 is a conceptual diagram of a summary of a discrimination processing of the image processing device according to the first embodiment;

FIG. 15 is a conceptual diagram of a summary of a discrimination processing of the image processing device according to the second embodiment;

DETAILED DESCRIPTION

Embodiments will be described below with reference to the drawings. In the following description, identical parts and configuration elements will be attached with identical signs. This is similarly applied to names and functions of the parts and constituent elements. Therefore, detailed description of these parts, constituent elements, names, and functions will not be repeated. Embodiments and/or modifications described below may be selectively combined together.

First Embodiment

A. Configuration of System

An image processing device of the embodiment can be applied to various kinds of applications. As an example, there will be described about an application for discriminating to which one of a plurality of kinds of types a work as a test object belongs, and also for making a robot give a certain operation to the work.

Figure 1:
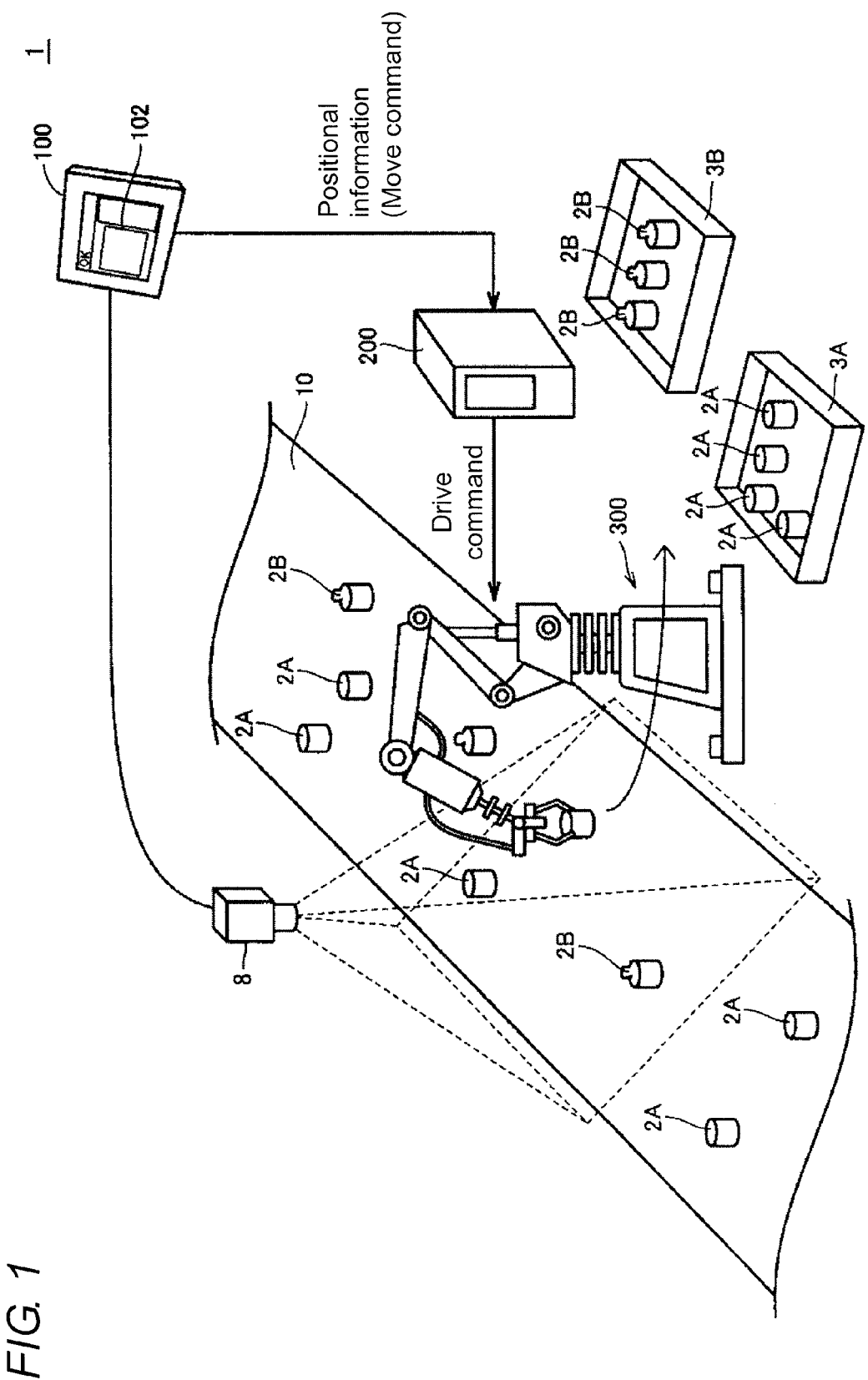
FIG. 1 is a schematic view of a configuration of a system including an image processing device according to a first embodiment.

FIG. 1 is a schematic view of a configuration of a system 1 including an image processing device 100 according to the embodiment. In FIG. 1, the system 1 mainly includes the image processing device 100, a robot controller 200, and a robot 300. The system 1 image-captures a part of a region on a conveyor 10 by using an image capturing unit 8, processes the image (hereinafter, also referred to as "input image") obtained by the image capturing, specifies a position and a type of a work as a test object conveyed on the conveyor 10, grasps the work at a predetermined position, based on information of the specified position and the specified type, and moves the work to a position corresponding to the type of the work. For example, two kinds of types of works (that is, a work 2A and a work 2B) are flowing on the conveyor 10. The image processing device 100 discriminates types of works that are flowing on the conveyor 10. The robot 300 moves the work 2A to a box 3A and moves the work 2B to a box 3B, according to the types of the discriminated works.

More specifically, the image processing device 100 executes the image processing described in detail below to the input image from the image capturing unit 8. The image processing device 100 outputs to the robot controller 200, positional information (or a move command) and type information obtained from an execution result of the image processing. The robot controller 200 drives the robot 300, by giving a drive command, following the information from the image processing device 100. Representatively, the robot 300 has a servomotor in each movable shaft, and the robot controller 200 outputs a pulse signal including pulses of a number corresponding to a moving amount calculated for each shaft.

In this way, because the robot 300 segregates the work for each type, the robot 300 can automatically segregate product types even when a plurality of product types of works have been flown. Accordingly, the system 1 can automate a box packing work for each product type.

In addition to the system that segregates the works for each type as shown in FIG. 1, the invention can be also applied to a system that performs an operation or a processing to the works. For example, when there have been registered for each type of a work in advance a disconnection position, a punching position, a grinding position, a printing position, and a coating position, the image processing device 100 can execute a processing corresponding to the registered information, according to the type of the work.

B. Conventional Technique and Problem Thereof

In order to enhance the understanding of the image processing device and the image processing method according to the embodiment, a conventional technique and a problem thereof will be summarized.

Figure 2A:
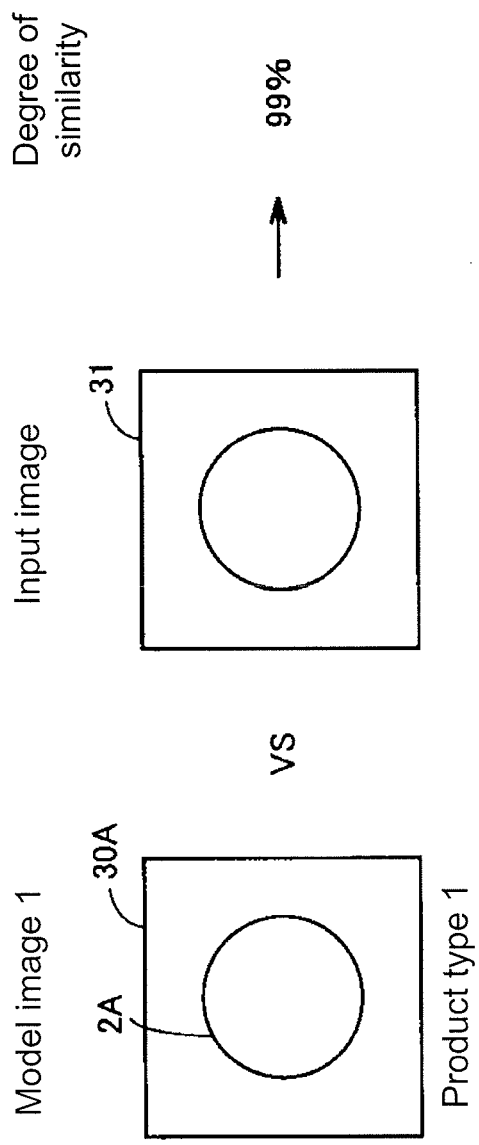
FIG. 2(A) and FIG. 2(B) are views for explaining a conventional technique and a problem of the conventional technique.
Figure 2B:
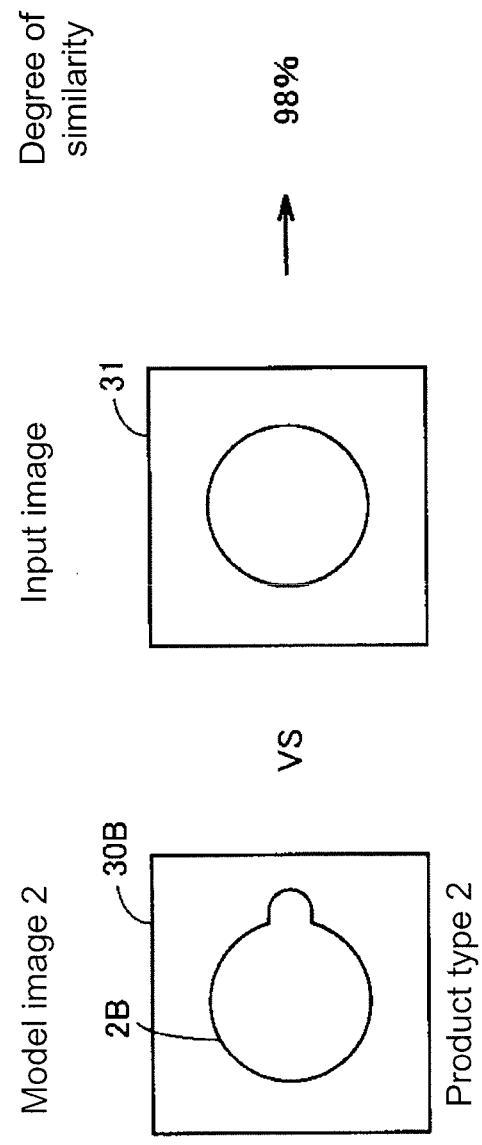

FIG. 2(A) and FIG. 2(B) are views for explaining the conventional technique and a problem of the conventional technique. As shown in FIG. 2(A) and FIG. 2(B), there have been registered a model image 30A obtained by image-capturing a product type 1 (work 2A) as a subject, and a model image 30B obtained by image-capturing a product type 2 (work 2B) of which a shape is similar to the product type 1, as a subject. Then, an input image 31 obtained by image-capturing the product type 1 as a subject is input. According to the conventional technique, a matching processing is executed by using each registered model image and the input image. In this case, in the matching processing of the image processing device according to the conventional technique, image information of the model image 30A and image information of the model image 30B match in most portions. Therefore, each degree of similarity to the input image becomes substantially the same. Consequently, when similar model images have been registered, a possibility of making an error in the discrimination of a product type becomes high.

Further, as other discrimination method, there is a linear discrimination analysis. The linear discrimination analysis is a method of extracting feature amounts from many model images prepared in advance for each product type, and generating a discrimination space in which a model image can be optimally segregated for each product type based on the extracted feature amounts. However, in order to generate a proper discrimination space, this method requires preparation of a sufficient number of model images each time when a new product type is registered, and therefore, is not practical. Further, according to the linear discrimination analysis, the user cannot grasp a region of the model image used for the discrimination. Therefore, even when a discrimination result has been obtained, the user cannot understand which portion included in the image information has been used to perform the discrimination processing.

The image processing device and the image processing method according to the embodiment display, in a mode in which the user can easily understand, a matching result of portions suitable for discrimination on the model images, even when similar model images have been registered. Accordingly, the user can confirm at a glance, which portion of the model image included in the information has been used to perform the discrimination.

C. Summary

In the case of discriminating which one of a plurality of product types having similar shapes a work belongs to, a matching result of portions of different shapes among registered works can be used to discriminate the work. This is because the portions of different shapes among the works can become useful information to discriminate the type of the work. This is also apparent from that, when discriminating a type of the work, a person judges the type of the work by using portions of different shapes among works, as a clue. Focusing attention on this point, the image processing device 100 according to the embodiment performs the matching processing of portions of different shapes among works with the input image.

A summary of the image processing that the image processing device 100 executes will be described below. The image processing device 100 has a registration mode for registering a model image, and a discrimination mode for discriminating a type of a work of a test object included in the input image. First, the registration processing of the model image will be described with reference to FIG. 3.

FIG. 3 is a conceptual diagram of a state that the image processing device 100 is extracting regions of different shapes of works between two model images.

The user performs the operation of registering the model image 30A using, as a subject, an object belonging to the product type 1 (work 2A), and the model image 30B using, as a subject, an object belonging to the product type 2 (work 2B). Based on the operation of the user, the image processing device 100 extracts feature amounts of the model image 30A and the model image 30B from the model image 30A and the model image 30B, respectively. The image processing device 100 determines, based on respectively extracted feature amounts, regions (hereinafter, also referred to as "non-common regions") having mutually different shapes between the work 2A belonging to the product type 1 and the work 2B belonging to the product type 2. Representatively, the image processing device 100 sets regions of different edges between model images, as non-common regions. Non-common regions are not limited to regions of different edges, and may be regions of which feature amounts are different among model images. The image processing device 100 stores the model image 30A and the model image 30B as model images, and also stores a non-common region of each model image.

Next, the discrimination processing of the image processing device 100 will be described with reference to FIG. 4. FIG. 4 is a conceptual diagram of a summary of a discrimination processing of the image processing device 100.

As shown in FIG. 4, the image processing device 100 matches the non-common region of the model image 30A with the region of the input image corresponding to the non-common region. Further, the image processing device 100 matches the non-common region of the model image 30B with the region of the input image corresponding to the non-common region.

As an example of the matching processing, the image processing device 100 performs a matching processing of each portion of a non-common region of the model image with the input image. More specifically, in each portion of a non-common region of the model image, the image processing device 100 searches for a region of the input image that has a high degree of similarity to the portion of the non-common region. The image processing device 100 regards that, out of each portion of the non-common region, a portion having a high degree of similarity to the input image has matched the input image. That is, the portion is regarded as a portion that has been able to be collated ("●" in FIG. 4). Further, the image processing device 100 regards that, out of each portion of the non-common region, a portion having a low degree of similarity to the input image has not matched the input image. That is, the portion is regarded as a portion that has not been able to be collated ("x" in FIG. 4).

After the matching has been completed, the image processing device 100 performs discrimination of a type of a work of a test object by using a matching result of each model image and also displays a result of the matching processing of each portion of the non-common regions of the model images. Representatively, the result of the matching processing is displayed in superposition with the model image. More specifically, in the non-common region, the image processing device 100 displays a matched portion and an unmatched portion by different modes ("●" and "x" in FIG. 4). Accordingly, even when similar model images have been registered, by displaying a matching result of non-common regions, the image processing device 100 can present to the user a matching result of portions suitable for type discrimination.

Further, the image processing device 100 performs a matching processing of each portion of the non-common region of model images with the input image, and outputs a discrimination result by using a matching result of portions of the non-common regions. As an example, the image processing device 100 calculates a discrimination score as a discrimination result. Out of portions of the non-common region, a portion having a higher degree of similarity to the input image has a higher discrimination score. Out of portions of the non-common region, a portion having a lower degree of similarity to the input image has a lower discrimination score. Representatively, the discrimination score is indicated by a proportion of the number of pixels of successful matching to the number of pixels included in the non-common region. The image processing device 100 can correctly discriminate a type of the work to be measured by discriminating a product type by using a matching result of non-common regions, even when similar model images have been registered.

A non-common "region" can be also regarded as aggregation of a plurality of points (pixels). Hereinafter, for convenience of description, a processing of determining or specifying mainly the "region" will be described. However, without limiting to this, each "point" (that is, aggregation of a plurality of pixels) can be specified or detected.

D. Hardware Configuration of Image Processing Device 100

Figure 5:
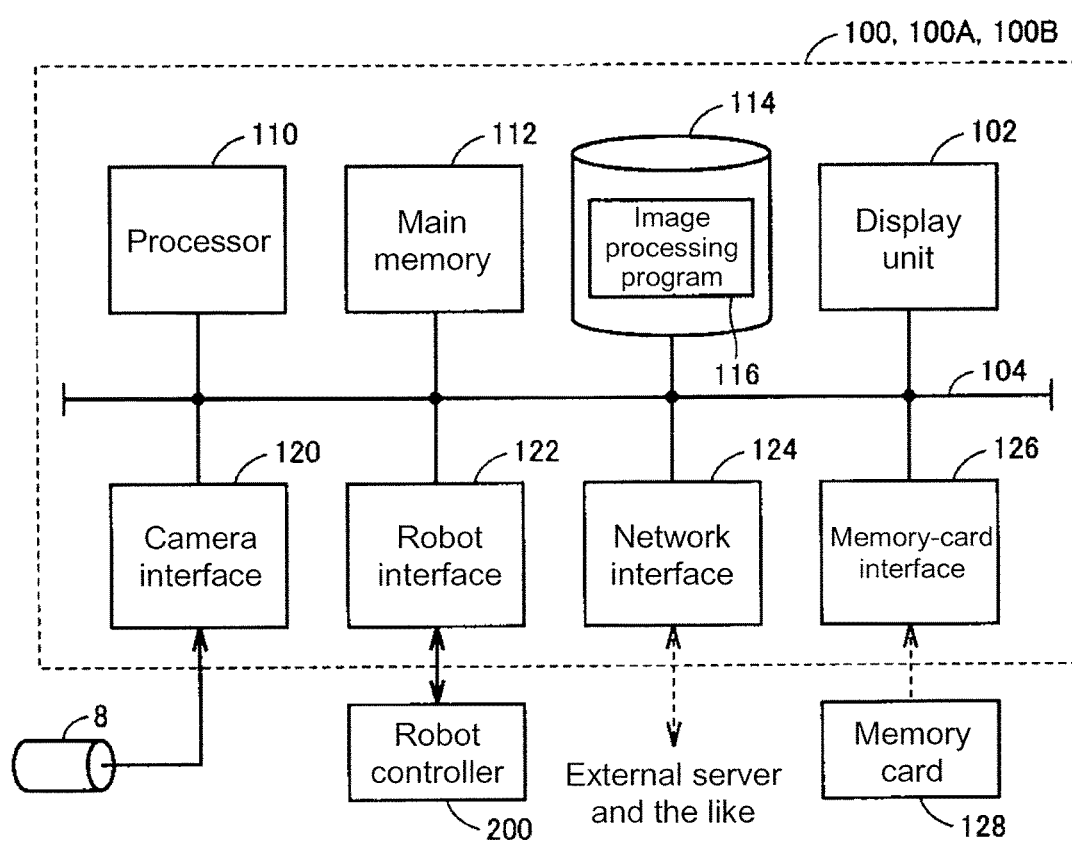
FIG. 5 is a schematic view of a hardware configuration of the image processing device according to the first embodiment.

FIG. 5 is a schematic view of a hardware configuration of the image processing device 100 according to the embodiment. In FIG. 5, the image processing device 100 representatively has a structure following a general-purpose computer architecture. The processor realizes various kinds of image processings described later, by executing a program installed in advance.

More specifically, the image processing device 100 includes a display unit 102, a processor 110 such as a CPU (Central Processing Unit) and an MPU (Micro-Processing Unit), a main memory 112, a hard disk 114, a camera interface 120, a robot interface 122, a network interface 124, and a memory card interface 126. These parts are connected to each other so as to be able to perform data communications via an internal bus 104.

The processor 110 executes the image processing of the embodiment, by reading an image processing program 116 stored in the hard disk 114, and executing the image processing program 116 by developing in the main memory 112. The display unit 102 displays various kinds of information accompanied with the execution of the image processing. A part or a whole of the execution result of the image processing may be output to the robot controller 200 through the robot interface 122.

The image processing program 116 is distributed in the state of being stored in a memory card 106, for example. In this case, the image processing program 116 stored in the memory card 106 is read through the memory card interface 126, and is then installed in the hard disk 114. Alternatively, the image processing program 116 may be configured to be distributed from the external server through the network interface 124.

In the case of using the image processing device 100 having a structure following a general-purpose computer architecture, there may have been installed an OS (Operating System) for providing a basic function of the computer. In this case, the image processing program 116 may be the one for executing a processing by calling a necessary module in a predetermined order and/or in a predetermined timing, out of program modules provided as a part of the OS. That is, all modules necessary for the image processing of the embodiment do not need to be included in the image processing program 116, and a part of the necessary modules may be provided from the OS. Further, the image processing program 116 of the embodiment may be provided by being built into a part of other program.

The camera interface 120 receives the input image obtained by image-capturing by the image capturing unit 8. The image capturing unit 8 is representatively configured by including image capturing elements such as a CCD (Coupled Charged Device) and a CMOS (Complementary Metal Oxide Semiconductor) sensor, in addition to an optical system such as a lens. FIG. 1 shows a configuration example that the image capturing unit 8 is provided separately from the image processing device 100, and an input image that becomes the object of the image processing is provided from the image capturing unit 8. However, the configuration is not limited to this example. For example, the image processing device 100 and the image capturing unit 8 may be integrally configured, and the image processing may be directly executed to the input image generated by the image capturing. Alternatively, the input image that becomes the object of the image processing may be given to the image processing device 100 via various kinds of memory mediums or communication mediums.

Alternatively, a part or a whole of the functions provided by executing the image processing program 116 may be installed as a dedicated hardware circuit.

E. Functional Configuration of Image Processing Device 100

Figure 6:
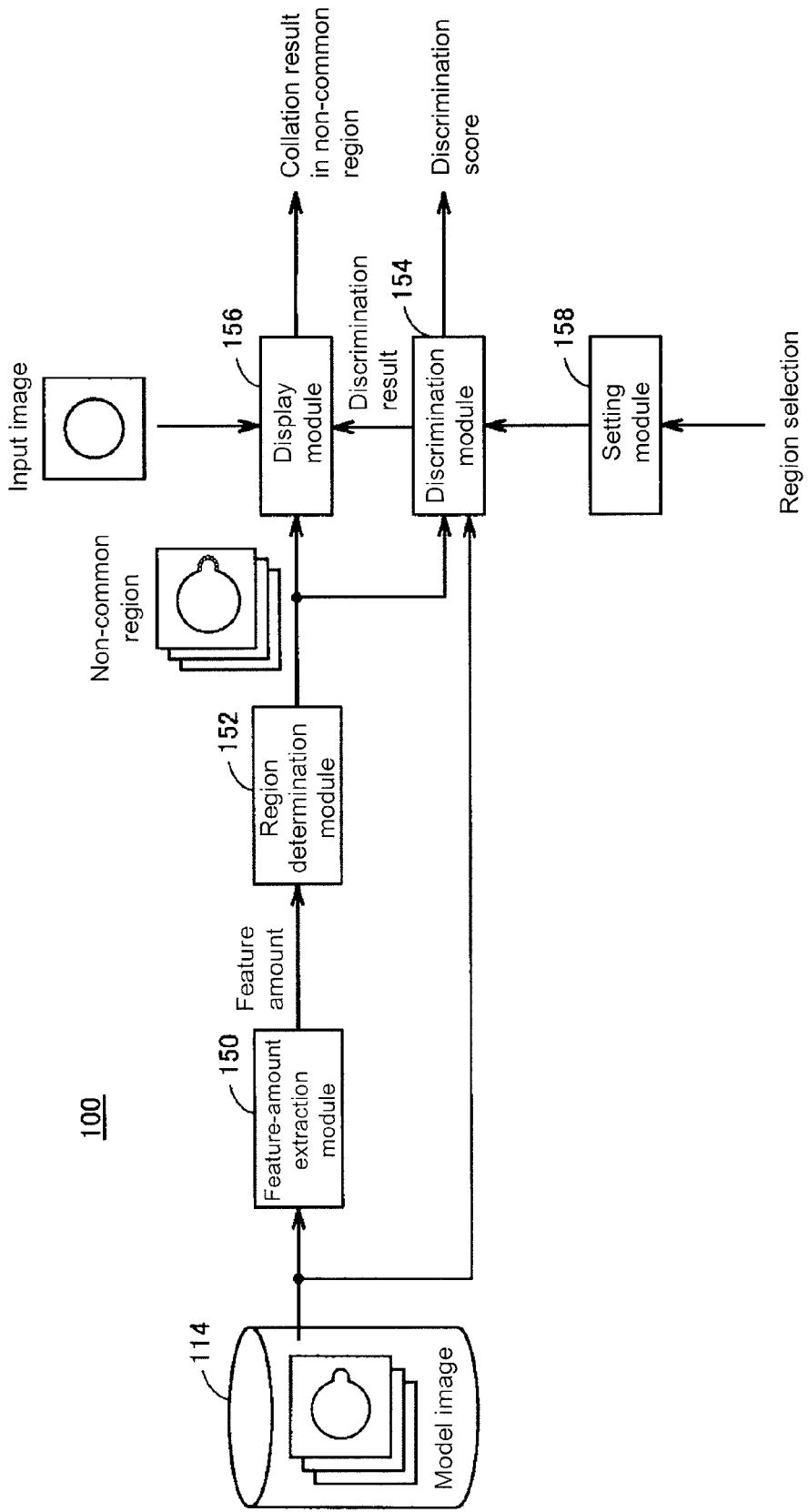
FIG. 6 is a schematic view of a functional configuration of the image processing device according to the first embodiment.

FIG. 6 is a schematic view of a functional configuration of the image processing device 100 according to the embodiment. Each module shown in FIG. 6 is representatively realized by the processor 110 executing the image processing program 116 (both shown in FIG. 5).

In FIG. 6, the image processing device 100 includes, as a functional configuration thereof, a feature-amount extraction module 150, a region determination module 152, a discrimination module 154, a display module 156, and a setting module 158. However, the setting module 158 is optional, and is provided according to the need.

The feature-amount extraction module 150 extracts a feature amount included in the model image obtained by image-capturing a reference object. Representatively, the feature-amount extraction module 150 extracts the edge as a feature amount by performing an edge extraction processing to the model image. The information of the extracted feature amount is output to the region determination module 152.

Based on each feature amount that has been respectively extracted from a plurality of model images, the region determination module 152 determines regions in which shapes of objects included in the model images are different from each other. That is, for each of the plurality of model images, the region determination module 152 determines a non-common region as a region which indicates a feature amount different from those of other model images. More specifically, the region determination module 152 compares the model images, and determines regions of mutually non-common edges as non-common regions. The non-common region is shown as coordinate information on the model image. The region determination module 152 outputs the determined non-common regions to the display module 156 and the discrimination module 154.

By using the feature amount corresponding to the non-common region out of the feature amounts of the works, the discrimination module 154 discriminates to which type the work of the test object included in the input image belongs to. More specifically, the discrimination module 154 performs a matching processing to the input image by using the feature amount corresponding to the non-common region of each work of a registration object, and also specifies a reference object having a higher discrimination score obtained as a result of the matching processing than those of works of other registration objects. A matching method that the discrimination module 154 executes may be any one of methods capable of matching the feature amounts extracted from the non-common region of the model image and the input image. For example, as matching methods, there are a method of searching for a region having a high correlation with the input image by using the feature amount (edge, edge code, and the like) extracted from the non-common region, template matching, and other matching method.

By using a matching result of non-common regions of model images, the discrimination module 154 discriminates to which one of types of a plurality of registered works the work included in the input image is similar. Representatively, by using a matching result of non-common regions of model images, the discrimination module 154 calculates a discrimination score for discriminating to which type the work included in the input image belongs, and discriminates a product type of the work by the discrimination score. Details of the discrimination module 154 will be described later.

The display module 156 displays a result of the matching processing performed to the input image, in the non-common region of the model image. Representatively, the display module 156 displays the matching result in superposition with the model image. Details of the display method of the matching result of the display module 156 will be described later.

The setting module 158 sets to non-common regions of model images, a region to be used for the discrimination processing of the discrimination module 154, and a region not to be used in the discrimination processing. Details of the setting module 158 will be described later.

F. Details of Registration Processing (F1. Details of the Region Determination Module 152)

Figure 7:
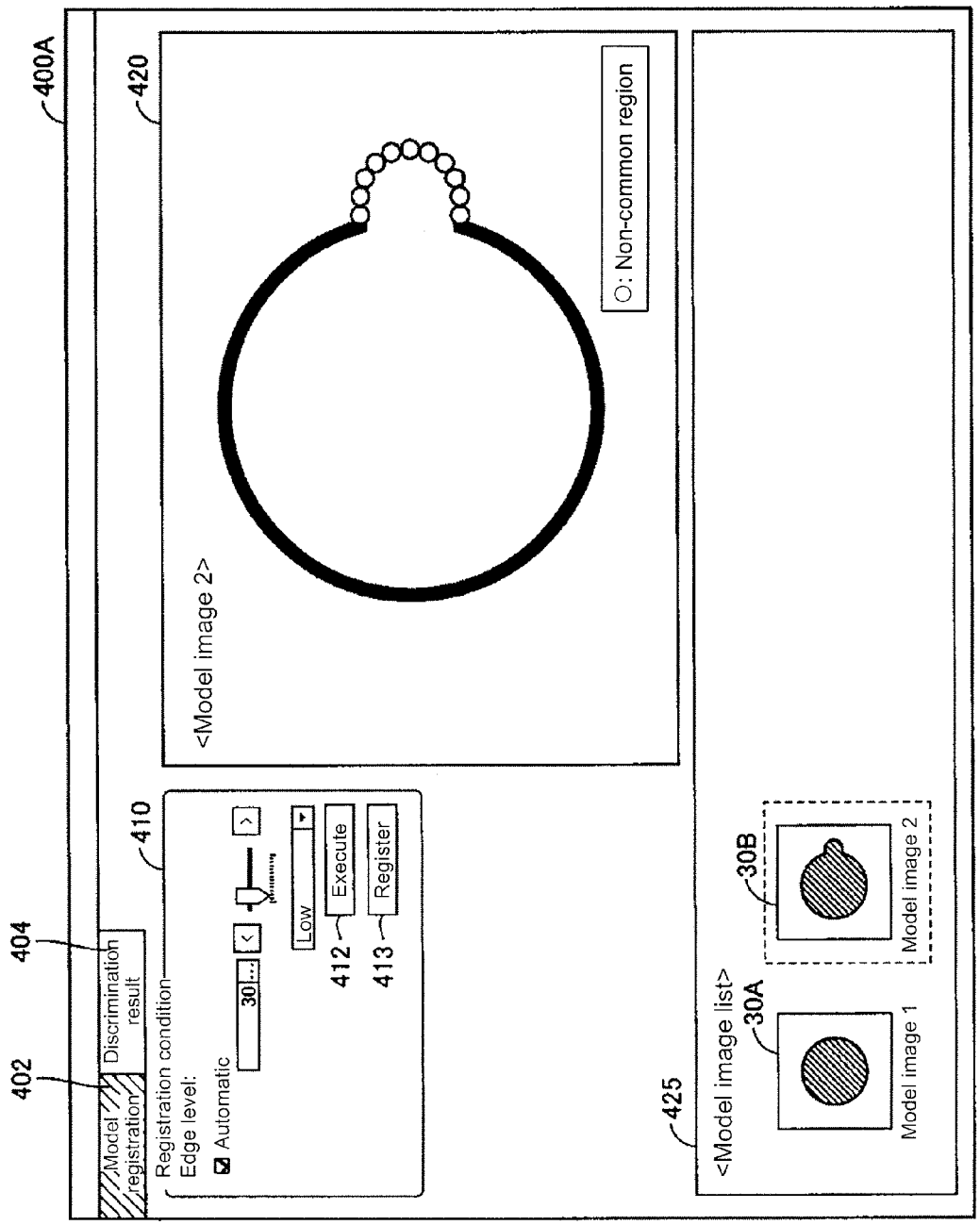
FIG. 7 shows an example of a registration screen for registering a model image.

With reference to FIG. 7, details of the registration processing of the model image will be described, and a display mode of the non-common region determined by the region determination module 152 will be described. FIG. 7 shows an example of a registration screen for registering the model image.

The image processing device 100 displays a non-common region determined by the region determination module 152, in a user identifiable mode, so that the user can confirm the non-common region when registering a model image. When the user can visually confirm the non-common region, the user can confirm at a glance a region of the model image in the matching result that is used to discriminate the type of the work.

Hereinafter, with reference to FIG. 7, a processing procedure for displaying the non-common region of the model image will be described. The image processing device 100 has been registered with a model image 30A and the model image 30B in advance. The user can register or edit the non-common region of the model image, by selecting a model registration tag 402 (a shaded portion in FIG. 7).

When the user has selected an execution button 412 of a model registration screen 400A by mouse operation and the like, the region determination module 152 compares a model image 30A and a model image 30B registered at present, and determines non-common regions of the respective model images. Representatively, the region determination module 152 positions the model image 30A and the model image 30B so that positions of the edges of the works included in the images match each other. The region determination module 152 specifies regions (that is, non-common regions) of different edge portions from positioned model images, for each model image.

When the user wants to confirm the non-common regions determined for the model images, by selecting a model image displayed in a model image list 425, the user can visually confirm the non-common region of the selected model image. For example, when the model image 30A displayed in the model image list 425 has been selected, the display module 156 displays the model image 30A in a display region 420, and displays the non-common region of the model image 30A in an identifiable mode ("○" in FIG. 7). Based on the display by the display module 156 of non-common regions of a model image selected by the user, the user can confirm a non-common region of the model image by suitably switching between non-common regions of the model image.

When the user has selected a registration button 413 of the model registration screen 400A, the image processing device 100 stores the model images and coordinate information indicating positions of the non-common regions on the model images, into the memory unit such as the hard disk 114, by relating the model image to the coordinate information to each other.

By setting various kinds of values to a registration condition 410, the user can adjust a region which the region determination module 152 regards as an edge. As adjusting methods of a region which is regarded as an edge, there are a method of assigning edge strength by a numerical value, a method of assigning edge strength by sliding a slide bar, a method of assigning edge strength according to a plurality of levels determined in advance, and the like. The region determination module 152 performs the edge extraction processing executed to the model image, regards a region of higher edge strength than set edge strength as an edge region, and regards a region of lower edge strength than the set edge strength as a non-edge region.

In the display region 420 in FIG. 7, the non-common region is indicated by "○". However, the display mode of the non-common region is not limited to this, and the region may be in the mode in which the user can identify the non-display region. For example, the non-common region may be displayed by other shape such as a triangle, and may be displayed by adding a color to the edge.

Further, the non-common region is not necessarily required to be specified at the registration processing time, and may be specified at the discrimination processing time described below.

(F2. Details of the Setting Module 158)

Figure 8:
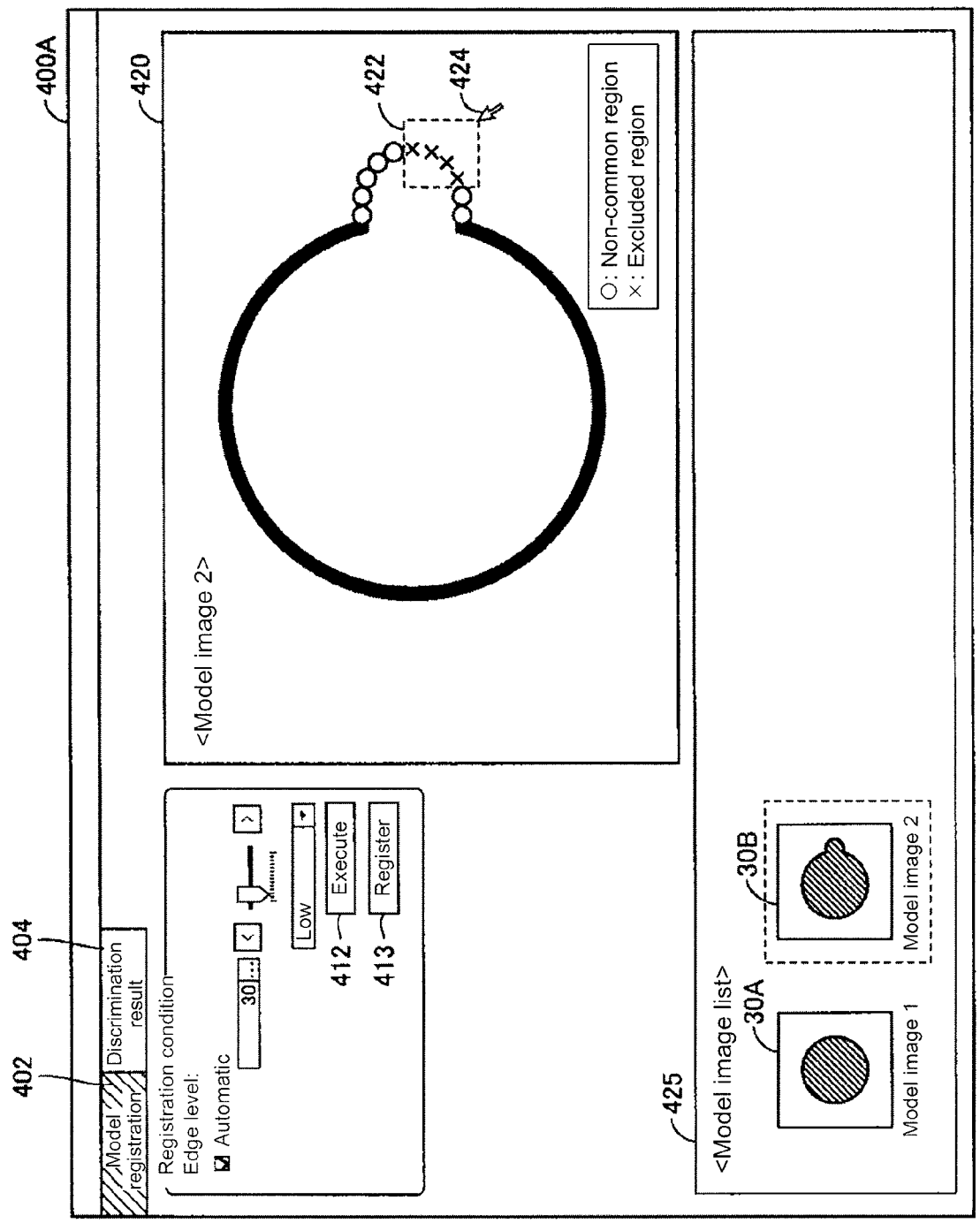
FIG. 8 shows an example of a registration screen for registering a model image.

With reference to FIG. 8, details of the processing of the setting module 158 will be described. FIG. 8 shows an example of a registration screen for registering model images.

In the non-common region, the user can set a region to be used in the discrimination processing of a type of a work, and a region not to be used in the discrimination processing. Accordingly, the image processing device 100 can exclude a region not suitable for the discrimination processing, and can improve accuracy of the discrimination processing.

Hereinafter, there will be described a processing procedure for setting a region to be used in the discrimination processing and a region not to be used in the discrimination processing, in the non-common region of the model image. In the non-common region ("○" in FIG. 8) shown in the display region 420 of the model registration screen 400A, the user can assign a region not suitable for the discrimination processing. As an example, a non-common region of the model image 30B is displayed in the display region 420. The user performs a region assignment (dotted line 422) to the non-common region, by operating a cursor 424 by the mouse and the like. In FIG. 8, a region not to be used in the discrimination processing is indicated by "x". When the registration button 413 has been selected after the user performed the region assignment to the non-common region, the image processing device 100 stores into the memory unit such as the hard disk 114, the model image, the coordinate information indicating the position of the non-common region on the model image, and the coordinate information indicating the position on the non-common region assigned by the user, by relating these pieces of information to each other.

In the above, the example of assigning a region not to be used in the discrimination processing has been described. However, the assigning method of a region is not limited to this. The assigning method of a region may be any method capable of setting a region to the non-common region. For example, in configuring the image processing device 100 as a touch panel, the image processing device 100 may be configured so that the user can assign a region by operating the touch panel, or may be configured so that pixels included in the non-common region can be individually assigned.

In FIG. 8, although a region not to be used in the discrimination processing is indicated by "x", a display mode of the region is not limited to this. It is sufficient when a region to be used in the discrimination processing and a region not to be used in the discrimination processing can be displayed by different modes. For example, the image processing device 100 may display the region to be used in the discrimination processing and the region not to be used in the discrimination processing, by differentiating colors, or by differentiating shapes.

G. Details of Discrimination Processing (G1. Details of the Discrimination Module 154 and the Display Module 156)

Figure 9:
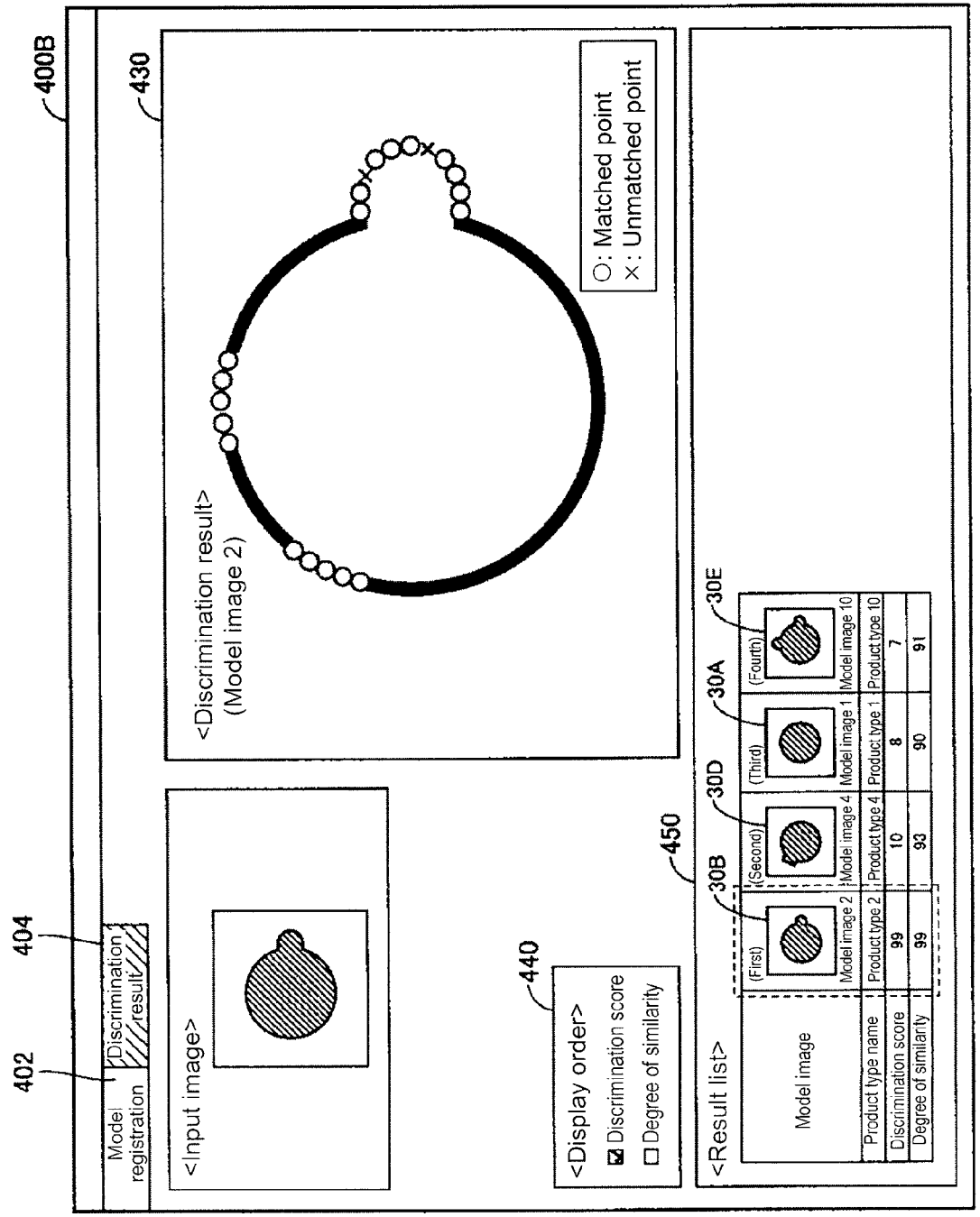
FIG. 9 shows an example of a result display screen that displays a discrimination result of a type to a work of a tested object.

With reference to FIG. 9, a display method of the discrimination result and details of the display module 156 and the discrimination module 154 will be described. FIG. 9 shows an example of the result display screen 400B that displays a discrimination result of a type of a work of the tested object.

After completing the matching processing of the input image with model images, the image processing device 100 displays in a result list 450 discrimination results of the input image, by arranging registered model images in the order of discrimination scores or degrees of similarity. The degree of similarity in this case is a result of a total of matching results of non-common regions and matching result of other regions. That is, the degree of similarity indicates relative similarity between the model image and the input image. Because the discrimination results are displayed in the order of discrimination scores and degrees of similarity calculated for each of the registered model images, the user can easily recognize the type of the work of the test object.

By the user switching between checks of a check box 440, the image processing device 100 switches discrimination results between the arraying in the order of discrimination scores and the arraying in the order of degrees of similarity. Accordingly, the user can suitably switch the display orders of the display results according to the need.

When the user wants to confirm in detail a matching result of a specific input image, by selecting a model image displayed in the result list 450, the user can confirm the matching result of the non-common region of the selected model image in detail on the screen.

As an example, in the display region 430, a matching result of the model image 30B selected by the user is displayed. As shown in FIG. 9, the display module 156 displays the matching result, in superposition with the non-common region of the model image. More specifically, the display module 156 displays by different modes a matching result of a relatively high degree of similarity to the input image and a matching result of a relatively low degree of similarity to the input image. For example, as shown in FIG. 9, a region discriminated to have a relatively high degree of similarity is indicated by "○", and a region discriminated to have a relatively low degree of similarity is indicated by "x".

In this way, by displaying matching results of non-common regions by different modes, the user can confirm at a glance a region used in the discrimination result, and can also intuitively understand which discrimination result of which portion of the non-common region is poor or good.

In FIG. 9, regions of which a matching result of the non-common region is satisfactory are indicated by "○" and regions of which a matching result of non-common region is unsatisfactory are indicated by "x". However, a display mode of the regions is not limited to this mode. There may be used any mode which enables the user to discriminate a good or poor matching result of non-common regions. For example, the image processing device 100 may display a region of a satisfactory matching result and a region of an unsatisfactory matching result by differentiating colors, or by differentiating shapes.

Further, a matching processing may be executed at not only the time of the discrimination processing of a work that is flowing in the line, but also at the time of the registration processing of a model image. In this case, for example, the user inputs to the image processing device 100 a test image obtained by image-capturing the work, and the image processing device 100 matches the input test image with the model image. The image processing device 100 displays a result of matching the test image, in the display region 430 in the mode as shown in FIG. 9. The user specifies a portion of the non-common region that is not suitable for the discrimination processing, by looking at a displayed matching result, and sets a region that is not to be used in the discrimination processing, by the above-described method. In this way, the user can select a region to be used in the discrimination processing and a region not to be used in the discrimination processing, according to the result of matching between the model image and the test image. Therefore, the matching result of non-common regions affecting a bad influence to the discrimination processing can be securely excluded.

Further, the image processing device 100 may be configured to perform the matching processing each time when the image capturing unit 8 image-captures the work, and the image processing device 100 may sequentially display the matching results of the non-common regions in the display region 430. Further, the image processing device 100 may first display in the display region 430, a result of a model image that has been discriminated to be the most similar to the input image out of the registered model images.

Further, in FIG. 9, although the example of displaying the matching result in superposition with the registration image has been described, the display module 156 may display the matching result in superposition with the input image. In this case, the display module 156 specifies a region on the input image corresponding to the non-common region, and displays the matching result on the specified region.

(G2. Modification 1 of Display Method of Matching Result)

Figure 10:
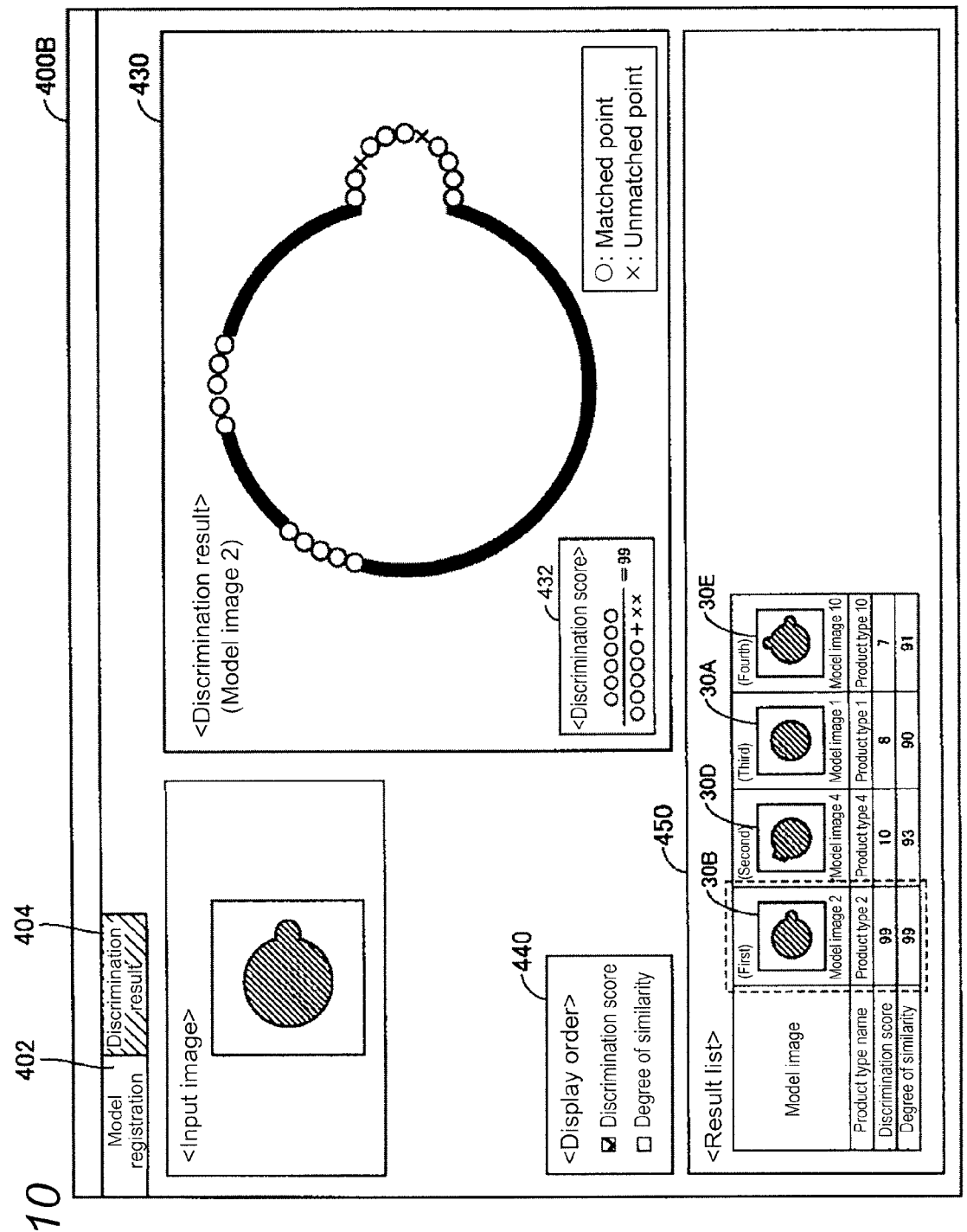
FIG. 10 shows a modification of a result display screen that displays a discrimination result of a type to a wok of a tested object.

With reference to FIG. 10, a modification of a display mode of the matching result will be described. FIG. 10 shows a modification of a result display screen 400B that displays a discrimination result of a type of a work of the tested object. The display module 156 may display a discrimination score by a shape to facilitate the user to visually understand the discrimination score. For example, as shown in a discrimination score region 432 in FIG. 10, the display module 156 displays the expression for calculating the discrimination score by shapes ("○" and "x").

In FIG. 10, although "○" and "x" are used as the shapes for indicating the discrimination scores in the discrimination score region 432, the display mode of discrimination scores is not limited to this. There may be used any mode which facilitates the user to visually understand a calculation method of discrimination scores. For example, the image processing device 100 may display discrimination scores by a mode of differentiating colors of a region of the satisfactory matching result and a region of the unsatisfactory matching result.

(G3. Modification 2 of Display Method of Matching Result)

Figure 11:
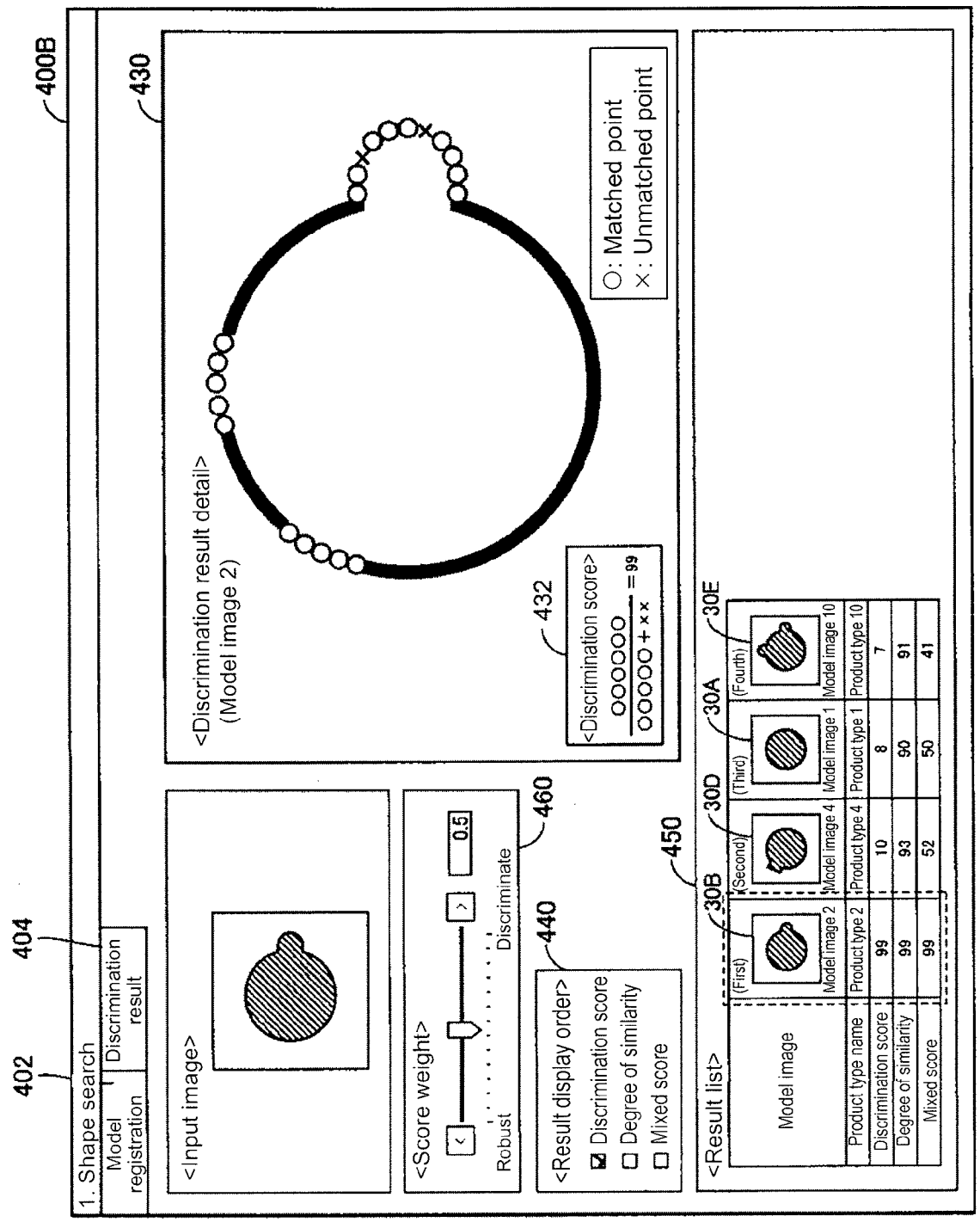
FIG. 11 shows other modification of a result display screen that displays a discrimination result of a type to a work of a tested object.

With reference to FIG. 11, other modification of a display mode of a matching result will be described. FIG. 11 shows other modification of the result display screen 400B that displays a discrimination result of a type of a work of the tested object.

The image processing device 100 may directly use a discrimination score as a score for discriminating a product type. However, the image processing device 100 may use a mixed score calculated by combining a discrimination score and a degree of similarity, as a final score for discriminating the product type. For example, the discrimination module 154 calculates a mixed score, by multiplying a calculated discrimination score by a predetermined weight, multiplying a calculated degree of similarity by a predetermined weight, and adding the multiplied results. As an example, the mixed score is given by the following Expression (1).

$$\text{Mixed score} = \alpha \times \text{discrimination score} + (1-\alpha) \times \text{degree of similarity}, \ 0 \leq \alpha \leq 1 \quad \text{Expression (1)}$$

The weight α for calculating the mixed score can be suitably changed by a user operation. For example, the user can adjust the weight α by operating a slide bar 460. Accordingly, the image processing device 100 can determine as a final output value, whether to set the weight sensitive to or robust to the difference between product types, according to the request of the user.

The calculated mixed scores are displayed in the result list 450 by arraying the mixed score with the discrimination scores and the degrees of similarity. By displaying the mixed scores by arraying, the user can confirm at a glance a relationship between the discrimination scores, the degrees of similarity, and the mixed scores.

Based on the switching of checks of the check box 440 by the user, the image processing device 100 switches discrimination results among the arraying in the order of the degrees of similarity, the arraying in the order of degrees of similarity, and the arraying in the order of mixed scores. Otherwise, the image processing device 100 may be also configured to be able to rearrange the discrimination results, according to various information. For example, the image processing device 100 may be configured to be able to rearrange the display of the discrimination results in the order of ID (Identification) attached to the model images of the user. Accordingly, the user can suitably switch display orders of the display results according to the need.

Although FIG. 11 shows the slide bar 460 as means for adjusting the weight of the mixed score, a weight adjusting method is not limited to this. For example, the result display screen 400B may be configured to enable the user to directly input the weight for calculating the mixed score, or may be configured to enable the user to select a weight level from a plurality of levels determined in advance ("high", "medium", "low", or the like).

H. Processing Procedure of the Image Processing Device 100

Figure 12:
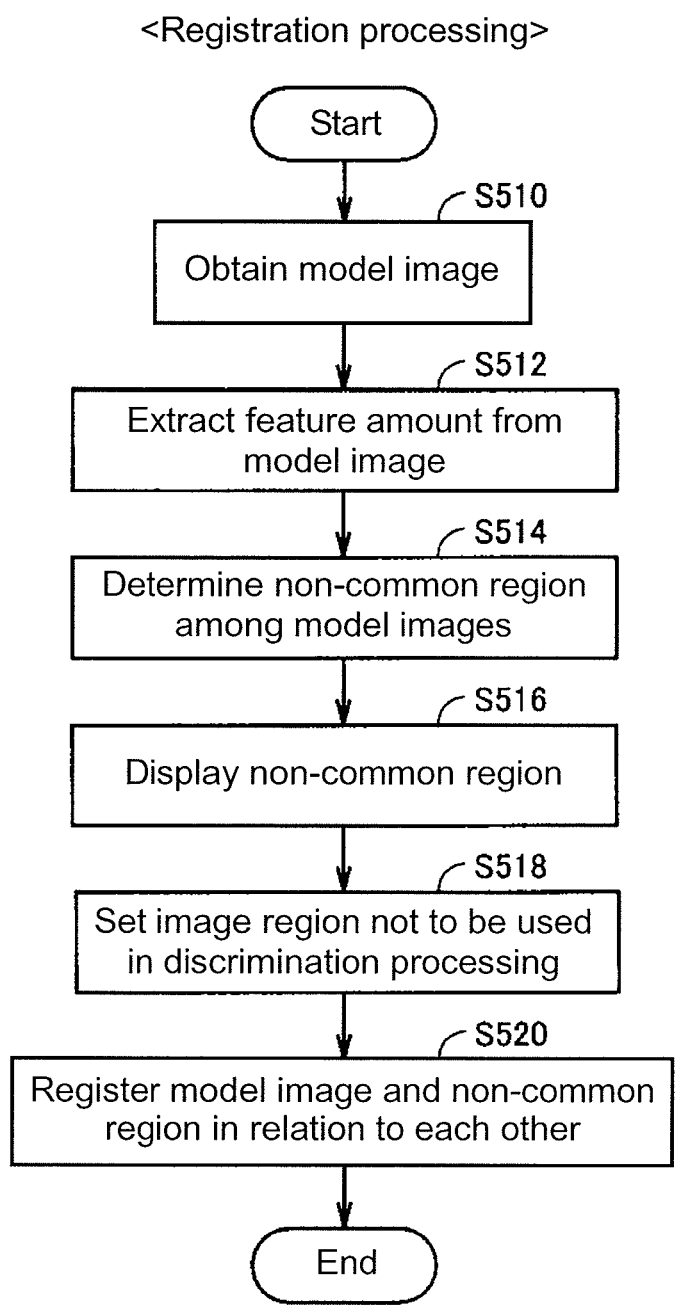
FIG. 12 is a flowchart of a registration processing of a model image.
Figure 13:
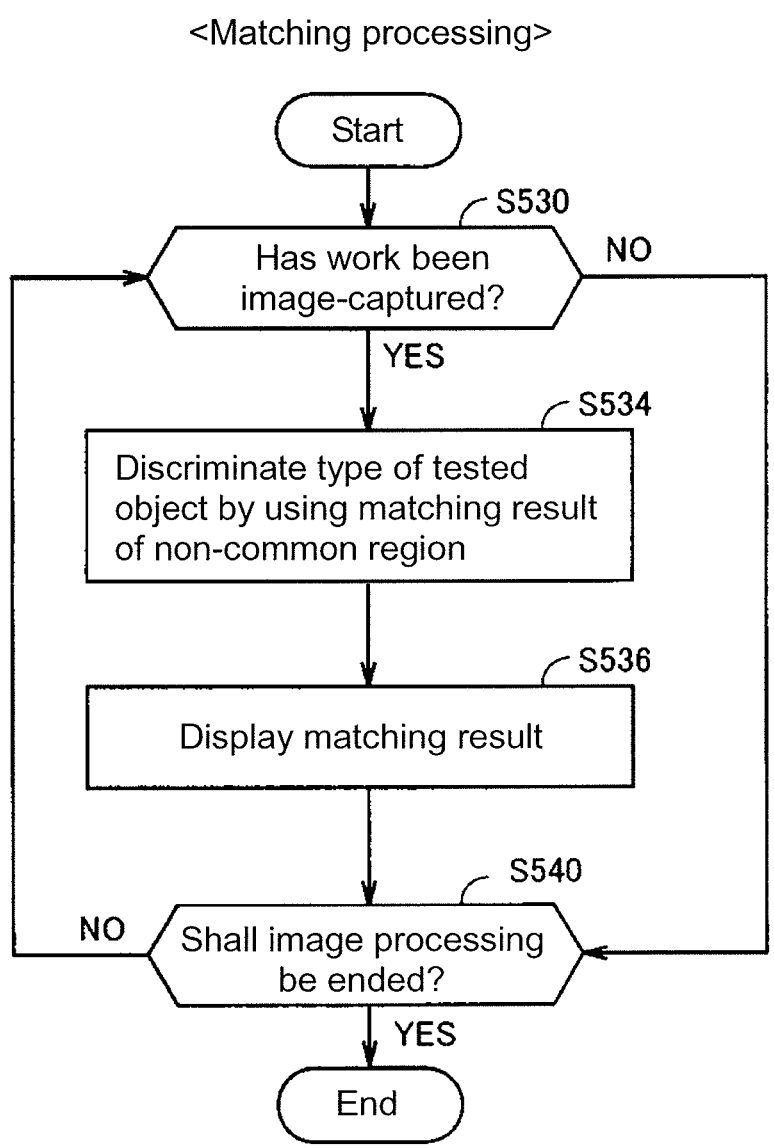
FIG. 13 is a flowchart of a discrimination processing of a model image and an input image.

With reference to FIG. 12 and FIG. 13, a control structure of the image processing device 100 will be described. Representatively, the processor 110 realizes the steps shown in FIG. 12 and FIG. 13 by executing the image processing program 116 (shown in FIG. 5). Basically, the matching processing is executed after the model registration processing has been executed. However, the order of these processings is not limited. Model information is registered in advance by the model registration processing at one time. By mutually using the registered model information, the matching processing may be performed to a plurality of input images. In other aspect, a part or a whole of the processing may be executed by a circuit element or other hardware.

(H1. Registration Processing Flow)

First, with reference to FIG. 12, a registration processing procedure of a model image will be described. FIG. 12 is a flowchart of the registration processing of the model image. Each step shown in FIG. 12 is executed when the processing mode of the image processing device 100 is the registration mode.

In FIG. 12, in Step S510, the processor 110 obtains a model image including the work as a subject. The processor 110 may obtain the model image from various kinds of recording mediums that store images obtained by image-capturing by other device. In Step S512, the processor 110, as the feature-amount extraction module 150, extracts a feature amount from the model image. Representatively, the processor 110 extracts the edge from the model image by executing the edge extraction processing to the model image.

In Step S514, the processor 110, as the region determination module 152, determines regions (that is, non-common regions) having mutually different shapes between works that belong to different product types. Representatively, the processor 110 compares model images including different product types, and sets regions of different edges on the images as non-common regions. In Step S516, the processor 110, as the display module 156, displays the non-common region in superposition with the model image, in the mode in which the user can identify.

In Step S518, the processor 110, as the setting module 158, receives setting of a region to be used in the discrimination processing and a region not to be used in the discrimination processing, to the non-common region of the model image. Representatively, the image processing device 100 is configured to enable the user to assign a region not to be used in the discrimination processing, to a displayed non-common region. The processor 110 sets to the assigned region, the information of the region on the corresponding model image, as the region not to be used in the discrimination processing. In Step S520, the processor 110 stores the model image and the non-common region in relation to each other. The processor 110 may store a model image itself as information to be used for the matching processing, or store the feature amount extracted from the model image.

(H2. Discrimination Processing Flow)

Next, with reference to FIG. 13, a procedure of the type discrimination processing of the work of the tested object will be described. FIG. 13 is a flowchart of the discrimination processing of the model image and the input image. Each step shown in FIG. 13 is executed when the processing mode of the image processing device 100 is the discrimination mode.

In FIG. 13, in Step S530, the processor 110 judges whether the image capturing unit 8 has image-captured the work that flows on the conveyor. Representatively, when the processor 110 has received the image signal from the image capturing unit 8, the processor 110 judges that the work has been image-captured. When the processor 110 has received the image signal from the image capturing unit 8 (YES in Step S530), the processor 110 switches the control to Step S534. When the image signal has not been received from the image capturing unit 8 (NO in Step S530), the processor 110 switches the control to Step S540.

In Step S534, the processor 110, as the discrimination module 154, executes the matching processing of each of the registered model images with the input image, by using the feature amount of the non-common region of the model image. Further, the processor 110 discriminates the type of the work of the tested object included in the input image, by using the matching result of non-common regions of model images. In Step S536, the processor 110, as the display module 156, displays the discrimination result of the work of the tested object.

In Step S540, the processor 110 judges whether to end the image processing according to the embodiment. When the processor 110 has received a user operation of ending the image processing, the processor 110 ends the image processing. When the processor 110 has judged to end the image processing according to the embodiment (YES in Step S540), the processor 110 ends the image processing. When the processor 110 has judged not to end the image processing according to the embodiment (NO in Step S540), the processor 110 executes the processing from Step S530 to Step S540 in order again.

I. Conclusion

In the manner as described above, the image processing device 100 according to the embodiment displays the matching results of the non-common regions. Accordingly, it becomes possible to indicate to the user to what extent portions (that is, non-common regions) that are different among a plurality of product types have been collated. Further, by performing product type discrimination by using the matching results of portions that are different among product types, even when similar product types have been registered, it becomes possible to correctly discriminate to which product type the test object belongs to.

Second Embodiment

Hereinafter, a summary of the image processing device 100A according to a second embodiment will be described. The image processing device 100A according to the embodiment is different from the image processing device 100 according to the first embodiment in that the discrimination processing is performed by using not only the matching result of regions, included in non-common regions, in which an edge should exist, but also the matching result of regions, included in the non-common regions, in which an edge should not exist. A hardware configuration is the same as that of the image processing device 100 according to the first embodiment. Therefore, description of the hardware configuration will not be repeated.

Figure 14:
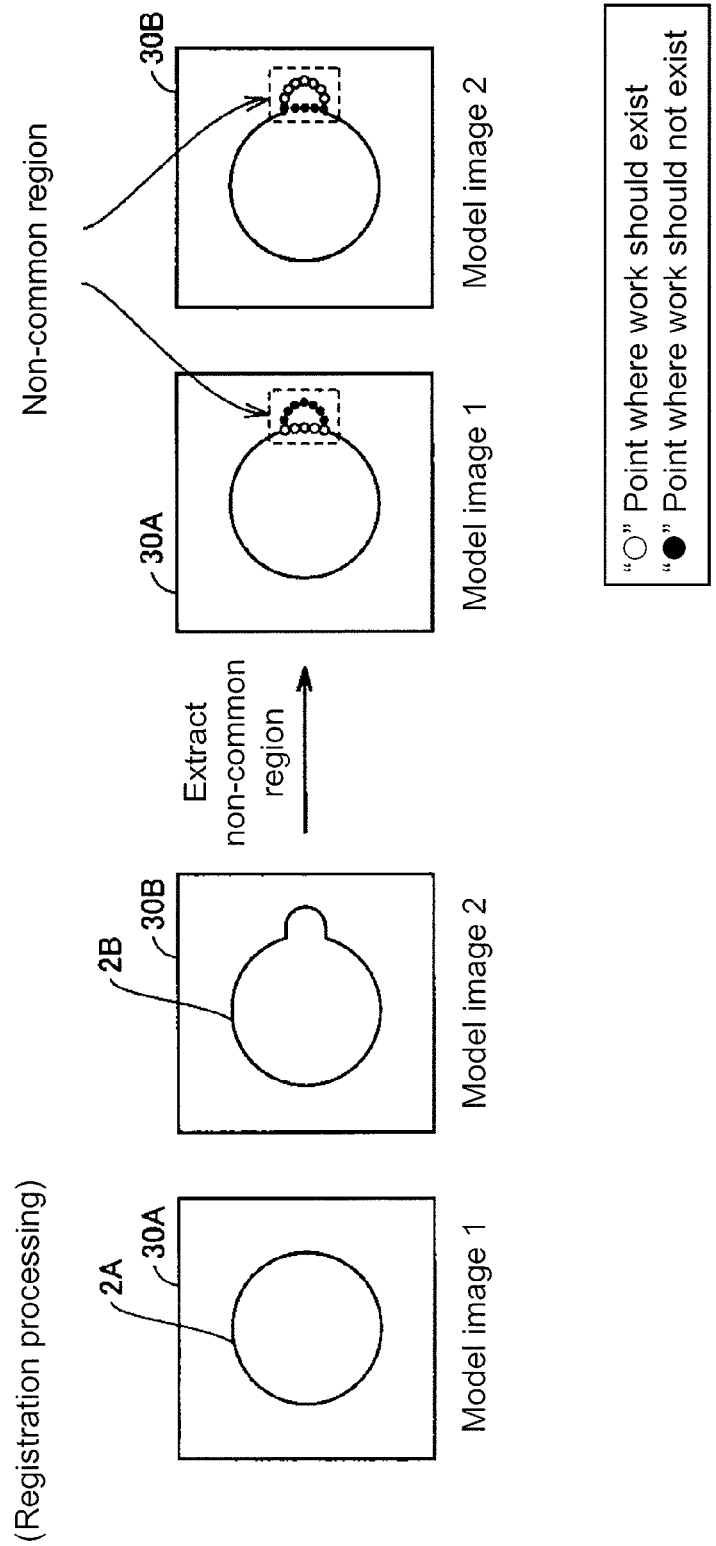
FIG. 14 is a conceptual diagram of a state that an image processing device is extracting regions of different shapes of works between two model images according to a second embodiment.

With reference to FIG. 14 and FIG. 15, a summary of the image processing device 100A according to the second embodiment will be described. FIG. 14 is a conceptual diagram of a state that the image processing device 100A is extracting regions of different shapes of works between two model images. First, with reference to FIG. 14, the registration processing that the image processing device 100A executes will be described.

The region determination module 152 included in the image processing device 100A determines mutually different regions (that is, non-common regions), by comparing the registered model images. At this time, each non-common region among the model images includes a region that includes a work in the non-common region (hereinafter, also referred to as "work region"), and a region that does not include a work in the non-common region (hereinafter, also referred to as "non-work region"). That is, the work region is a region in which a work is included in the region within the non-common region. The non-work region is a region in which a work is not included in the region within the non-common region.

As an example, FIG. 14 shows a work region and a non-work region of the model image 30A and the model image 30B, respectively, that have been determined by comparing the model image 30A with the model image 30B. The model image 30A shows a non-common region to the model image 30B using the model image 30A as a reference. More specifically, in the model image 30A, a region (that is, a work region) that includes a work in the model image 30A and that does not include a work in the model image 30B is indicated by "○". Further, in the model image 30A, a region (that is, a non-work region) that does not include a work in the model image 30A and that includes a work in the model image 30B is indicated by "●".

Similarly, the model image 30B shows a non-common region to the model image 30A using the model image 30B as a reference. More specifically, in the model image 30B, a region (that is, a work region) that includes a work in the model image 30B and that does not include a work in the model image 30A is indicated by "○". Further, in the model image 30B, a region (that is, a non-work region) that does not include a work in the model image 30B and that includes a work in the model image 30A is indicated by "●".

After the work regions and the non-work regions have been determined, the image processing device 100A stores the model image 30A and the model image 30B, and also stores the work regions and the non-work regions of the model images.

Next, with reference to FIG. 15, the discrimination processing that the image processing device 100A executes will be described. FIG. 15 is a conceptual diagram of a summary of a discrimination processing of the image processing device 100A. The image processing device 100A according to the embodiment performs the discrimination processing by using not only the matching result of the work regions but also the matching results of both the work regions and the non-work regions.

As a detailed procedure of the discrimination processing, as shown in FIG. 15, the image processing device 100A matches the work region and the non-work region of the registered model image 30A with the input image by using feature amounts extracted from both the work region and the non-work region. Similarly, the image processing device 100A matches the work region and the non-work region of the registered model image 30B with the input image by using feature amounts extracted from both the work region and the non-work region.

After completing the matching, the image processing device 100A displays matching results of both the work region and the non-work region of the model image. Representatively, in superposition with the model image, the image processing device 100A displays the matching result in the work region and the non-work region, and displays in different modes a matched portion and an unmatched portion ("●" and "x" in FIG. 15). In this way, even when similar model images have been registered, the image processing device 100A can present to the user matching results of regions suitable for the discrimination of the type, by displaying the matching results of the work region and the non-work region.

Further, the image processing device 100A calculates a discrimination score for discriminating which type the work included in the input image belongs to, based on the matching results of the work region and the non-work region. Representatively, the discrimination score is indicated by a proportion of the number of pixels of successful matching to the number of pixels included in the work region and the non-work region.

In FIG. 14, although the work region is indicated by "○" and the non-work region is indicated by "●", the display mode of the work region and the non-work region is not limited to this mode. For example, the image processing device 100A may display the work region and the non-work region by the color-differentiating mode or the shape-differentiating mode. The work region and the non-work region may be regions on the edges on the model image.

In the manner as described above, by discriminating types of works by using both matching results of the work region and the non-work region, the image processing device 100A according to the embodiment can further improve the accuracy of product type discrimination of works, as compared with the case of using only the matching result of the work region.

Third Embodiment

Hereinafter, a summary of an image processing device 100B according to a third embodiment will be described. The image processing device 100B according to the embodiment is different from the image processing device 100 according to the first embodiment in that the image processing device 100B calculates discrimination scores by placing weight to each matching result of non-common regions. A hardware configuration is the same as that of the image processing device 100 according to the first embodiment. Therefore, description of the hardware configuration will not be repeated.

Figure 16:
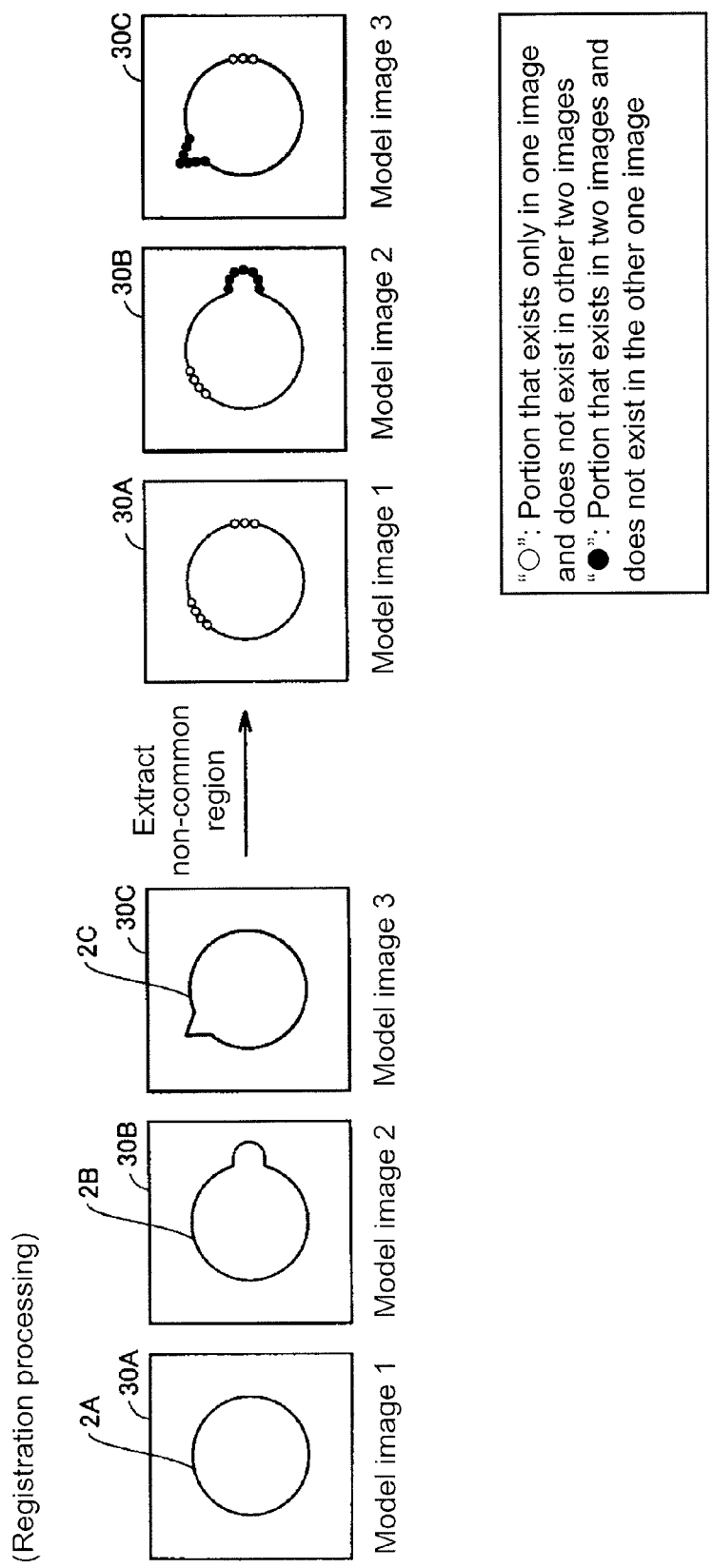
FIG. 16 is a conceptual diagram of a state that an image processing device is extracting regions of different shapes of works between two model images according to a third embodiment.
Figure 17:
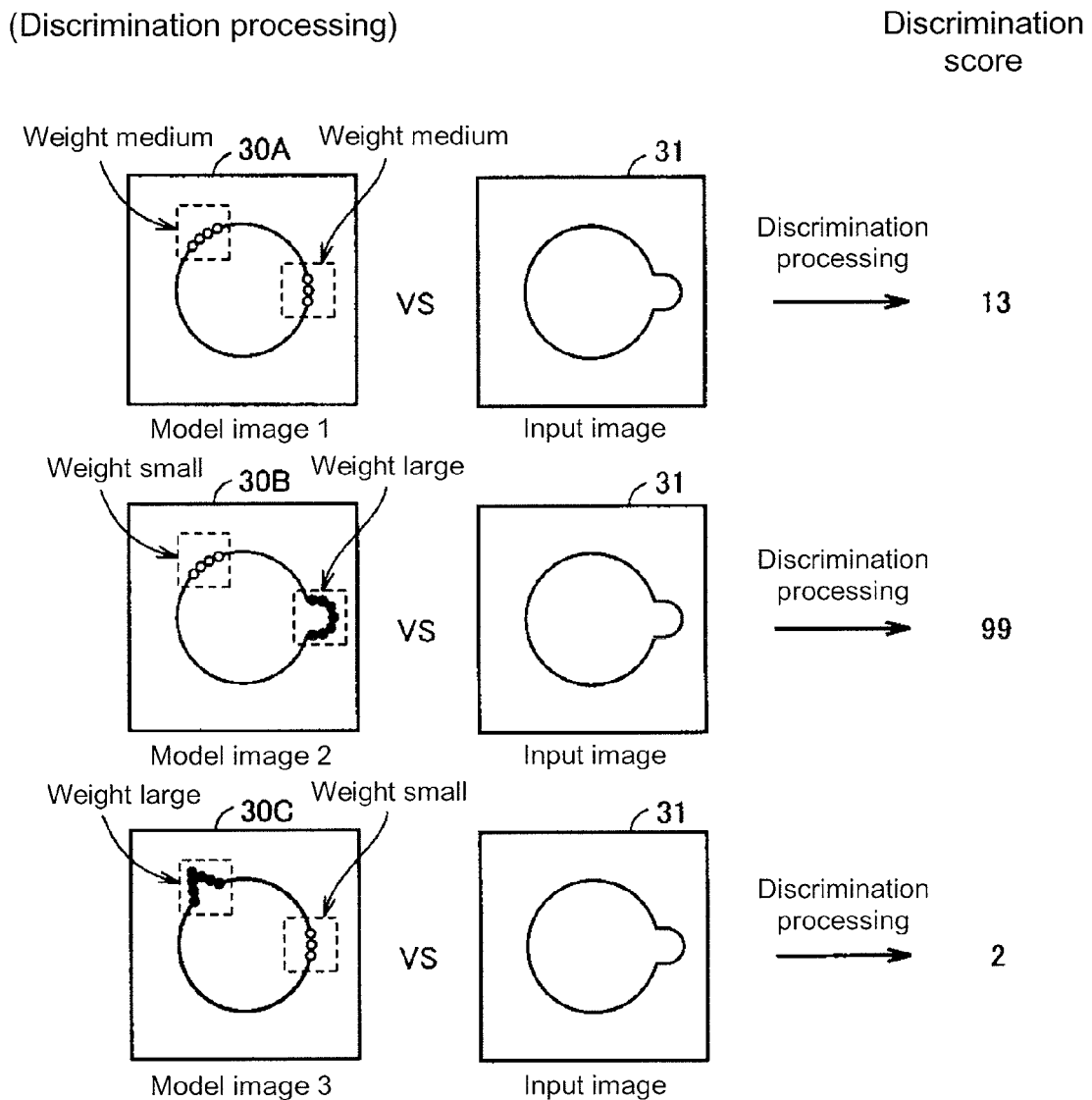
FIG. 17 is a conceptual diagram of a summary of a discrimination processing of the image processing device according to the third embodiment.

With reference to FIG. 16 and FIG. 17, a summary of the image processing device 100B according to the third embodiment will be described. FIG. 16 is a conceptual diagram of a state that the image processing device 100B is extracting regions of different shapes of works between two model images. FIG. 17 is a conceptual diagram of a summary of a discrimination processing of the image processing device 100B. First, with reference to FIG. 16, the registration processing that the image processing device 100B executes will be described.

The user performs the operation of registering the model image 30A using, as a subject, an object belonging to the product type 1 (work 2A), the model image 30B using, as a subject, an object belonging to the product type 2 (work 2B), and a model image 30C using, as a subject, an object belonging to a third type 3 (work 2C). Based on the user registration operation, the image processing device 100B extracts each feature amount from the model image 30A, the model image 30B, and the model image 30C, respectively. Based on the extracted feature amounts, the image processing device 100B determines regions, (that is, non-common regions) having mutually different shapes among the object belonging to the product type 1, the object belonging to the product type 2, and the object belonging to the third type. Representatively, the image processing device 100B sets regions of different edges between the model images, as non-common regions.

In the example shown in FIG. 16, as edges of non-common regions of the model images, there are an edge ("●" in FIG. 16) that exists in only one image and does not exist in other two images, and an edge ("○" in FIG. 16) that exists in two images and does not exist in the other one image. A matching result of unique non-common regions among model images is considered useful information for discriminating a type of the work. Therefore, the image processing device 100B sets such that the matching result of unique non-common regions gives a large influence to the discrimination result. That is, the image processing device 100B calculates a discrimination score by giving a larger weight to a matching result of unique non-common regions among model images.

As an example, weighting of the matching results will be described by taking the example of a non-common region 45 and a non-common region 47 of the model image 30B in FIG. 17. The edge of the non-common region 45 is unique in that the edge does not exist in other model images (the model image 30A and the model image 30C), and exists only in the model image 30B. Further, the edge of the non-common region 47 does not exist in the model image 30C, but exists in a region 41 of the model image 30A. Therefore, in the model image 30B, the edge of the non-common region 45 is more useful than the edge of the non-common region 47, as the information for discriminating with other model image. Therefore, the discrimination module 154 places weight to the matching result of the non-common region 45 more than the matching result of the non-common region 47.

The image processing device 100B may change the display mode of a non-common region according to the weight so that the user can visually recognize the weight added to the non-common region. For example, the image processing device 100B changes the color and concentration of the display of the non-common region according to the weight added to the non-common region. More specifically, the image processing device 1008 displays in a darker color when the weight becomes large, and displays in a lighter color when the weight becomes smaller. Further, the image processing device 100B may display the weight of the vicinity of the non-common region as a numerical value.

In the manner as described above, the image processing device 100B according to the embodiment changes the display mode of the non-display region according to the weight added to the non-display region. Therefore, the user can intuitively understand which portion of the non-common region has contributed by which degree to the discrimination processing. Further, by arranging such that the image processing device 100B calculates a discrimination score by adding a large weight to the non-common region that can be discriminated from other model image, the image processing device 100B can correctly discriminate the type of the work of the tested object even when many similar model images have been registered.

It should be considered that the embodiment disclosed this time is an exemplification in all aspects and is not limiting. The scope of the present invention is expressed in claims and not in the above description, and is intended to include all variations in the meaning and the scope equivalent to the claims.

The invention claimed is:

1. An image processing device, comprising:
a memory configured to hold a feature amount obtained from model images of a plurality of reference objects belonging to mutually different types;
a processor configured to:
determine a non-common region indicating a feature amount different from model images of other reference objects, within a model image of each reference object;
discriminate which type an input object comprised in an input image belongs to, by using a feature amount corresponding to a non-common region of the input object out of feature amounts of the reference objects;
perform a first matching processing to the input image by using the feature amount corresponding to the non-common region of each reference object, and specify one of the reference objects of which a score obtained as a result of the first matching processing is higher than those of other reference objects; and
perform a second matching processing of each portion of the non-common region of the one of the reference objects with the input image, and calculate the score by using a result of the second matching processing of each portion of the non-common region; and
a display configured to display, in an identifiable mode, a result of the first matching processing to the non-common region of any one model image out of the model images,
wherein the display is configured to display, in superposition with any one model image of the model images, the result of the first matching processing to the non-common region of the model image.

2. The image processing device according to claim 1, wherein the image processing device further sets a region to be used in a discrimination processing of the processor and a region not to be used in the discrimination processing, to a non-common region of at least one model image out of the model images.

3. The image processing device according to claim 2, wherein the processor is configured to set the region to be used in the discrimination processing such that a matching processing result of a unique non-common region among the model images gives a large influence to a discrimination result of which type the input object belongs to.

4. The image processing device according to claim 3, wherein the processor is configured to perform a third matching processing of each portion of the non-common region of any one model image with the input image, and is configured to calculate a score by using a result of the third matching processing of each portion of the non-common region.

5. The image processing device according to claim 1, wherein the display is configured to display, by different modes, a result of the first matching processing for which a degree of similarity to the input image is relatively high, and a result of the first matching processing for which a degree of similarity to the input image is relatively low.

6. The image processing device according to claim 5, wherein the display is configured to display, in an identifiable mode, the non-common region of any one model image of the model images, in superposition with the model image.

7. The image processing device according to claim 6, wherein
the non-common region comprises an object region in which an object is comprised in the non-common region, and the display is configured to display, in an identifiable mode, an object region comprised in the non-common region of any one model image out of the model images, in superposition with the model image.

8. The image processing device according to claim 7, wherein the non-common region further comprises a non-object region in which an object is not comprised in the non-common region, and
the display is configured to display, by different modes, the object region comprised in the non-common region of any one model image out of the model images and the non-object region comprised in the non-common region of the model image, in superposition with the model image.

9. The image processing device according to claim 1, wherein
the processor is configured to perform an edge extraction process for each of the model images, the edge extraction process extracting an edge of each model image as the feature amount.

10. The image processing device according to claim 9, wherein
the processor is configured to determine the non-common region included in each model image by determining regions of mutually non-common edges amongst the model images.

11. The image processing device according to claim 10, wherein
the non-common region included in each model image includes coordinate information of the reference object in the model image.

12. The image processing device according to claim 9, wherein
a numerical value indicating an edge strength is associated with the edge of each model image, and
the processor is configured to exclude regions of the edge of each model image from the non-common region based on the edge strength.

13. The image processing device according to claim 1, wherein
the processor is configured to determine the non-common region included in each model image by determining regions in which shapes of the reference objects included in the model images are different amongst the model images.

14. The image processing device according to claim 1, further comprising:
an input for receiving a registration operation from a user, the registration operation including a registration of each of the model images in association with one of the different types.

15. An image processing method, comprising:
holding a feature amount obtained from model images of a plurality of reference objects belonging to mutually different types;
determining a non-common region indicating a feature amount different from model images of other reference objects, within a model image of each reference object;
discriminating which type an input object comprised in an input image belongs to, by using a feature amount corresponding to a non-common region of the input object out of feature amounts of the reference objects;
performing a first matching processing to the input image by using the feature amount corresponding to the non-common region of each reference object, and specifying one of the reference objects of which a score obtained as a result of the first matching processing is higher than those of other reference objects;
performing a second matching processing of each portion of the non-common region of the one of the reference objects with the input image, and calculating the score by using a result of the second matching processing of each portion of the non-common region; and
displaying, on a display and in an identifiable mode, a result of the first matching processing to the non-common region of any one model image out of the model images,
wherein the result of the first matching processing to the non-common region of the model image is configured to be displayed on the display in superposition with any one model image of the model images.

16. A non-transitory computer-readable medium storing computer executable instructions that, when executed by a computer, cause the computer to perform operations, the operations comprising:
holding a feature amount obtained from model images of a plurality of reference objects belonging to mutually different types;
determining a non-common region indicating a feature amount different from model images of other reference objects, within a model image of each reference object;
discriminating which type an object comprised in an input image belongs to, by using a feature amount corresponding to a non-common region of the input object out of feature amounts of the reference objects;
performing a first matching processing to the input image by using the feature amount corresponding to the non-common region of each reference object, and specifying one of the reference objects of which a score obtained as a result of the first matching processing is higher than those of other reference objects;
performing a second matching processing of each portion of the non-common region of the one of the reference objects with the input image, and calculating the score by using a result of the second matching processing of each portion of the non-common region; and
displaying, on a display and in an identifiable mode, a result of the first matching processing to the non-common region of any one model image out of the model images,
wherein the result of the first matching processing to the non-common region of the model image is configured to be displayed on the display in superposition with any one model image of the model images.

* * * * *